US007623958B1

(12) United States Patent
Laverick et al.

(10) Patent No.: US 7,623,958 B1
(45) Date of Patent: Nov. 24, 2009

(54) NAVIGATIONAL DEVICE FOR INSTALLATION IN A VEHICLE AND A METHOD FOR DOING SAME

(75) Inventors: David J. Laverick, Overland Park, KS (US); Brian G. Schoenfish, Kansas City, KS (US)

(73) Assignee: Garmin Ltd. (KY)

( * ) Notice: Subject to any disclaimer, the term of this patent is extended or adjusted under 35 U.S.C. 154(b) by 337 days.

(21) Appl. No.: 10/663,044

(22) Filed: Sep. 13, 2003

Related U.S. Application Data

(63) Continuation-in-part of application No. 10/411,821, filed on Apr. 11, 2003, which is a continuation-in-part of application No. 10/397,662, filed on Mar. 26, 2003.

(51) Int. Cl.
*H05K 5/02* (2006.01)
*G01C 21/00* (2006.01)
(52) U.S. Cl. ..................... 701/200; 361/679; 455/345; 455/348; 455/350
(58) Field of Classification Search ......... 701/200–215; 296/24.3, 24.34, 37.1, 37.8, 37.12, 37.13; 224/483, 275, 542–544, 584–585; 361/679, 361/681, 686; 455/344–346, 348, 350
See application file for complete search history.

(56) References Cited

U.S. PATENT DOCUMENTS 2,883,234 A * 4/1959 Biondo ................. 296/37.9

(Continued)

FOREIGN PATENT DOCUMENTS

DE 3820510 12/1989

(Continued)

OTHER PUBLICATIONS

Garmin 010-10314-00 Carry case. Evidence of public use or sale given by advertisement on Amazon.com. Date first available at Amazon.com: Oct. 2, 2001. http://www.amazon.com/gp/product/B00004VX39/ref=pd_cp_e_title/002-6032276-8003210. Downloaded: Feb. 27, 2007.*

(Continued)

*Primary Examiner*—Eric Bolda
*Assistant Examiner*—Ari M Diacou
(74) *Attorney, Agent, or Firm*—Samuel M. Korte

(57) ABSTRACT

A navigation assembly (177*i*) comprising a carrying case (178*i*), a cradle (179*i*), a navigational device (10*i*), and a speaker (57*i*) is provided. The carrying case (178*i*) is sized and configured to fit within a tray (14*i*) of a vehicle, wherein the tray (14*i*) was formed during manufacture of the vehicle and designed to hold miscellaneous articles. The cradle (179*i*) is pivotably mounted within the case (178*i*) and is sized and configured to receive the navigational device (10*i*). The cradle (179*i*) and navigational device (10*i*) are operable to pivot from a flat, nested position within the case (178*i*) upwards to a viewing position approximately perpendicular to the flat, nested position. A navigation assembly (177*j*) comprising a cradle (179*j*), a navigational device (10*j*), and a lid (184*j*) is also provided. The cradle (179*j*) is pivotably mounted within a tray (14*j*) of a vehicle, where the tray (14*j*) was formed during manufacture of the vehicle and designed to hold miscellaneous articles. The navigational device (10*j*) is sized and configured to mount within the cradle (179*j*). The lid (184*j*) is hingedly secured to the tray (14*j*) and is operable to enclose the navigational device (10*j*) and cradle (179*j*).

24 Claims, 12 Drawing Sheets

U.S. PATENT DOCUMENTS

| | | | | |
|---|---|---|---|---|
| 3,617,985 | A | * 11/1971 | Kehl | 439/341 |
| 3,946,826 | A | 3/1976 | Guhl et al. | 180/90 |
| 3,971,889 | A | * 7/1976 | Hays | 381/124 |
| 4,105,246 | A | * 8/1978 | Trumbull | 296/97.7 |
| 4,132,295 | A | * 1/1979 | Hochfelsen | 190/102 |
| 4,194,585 | A | * 3/1980 | Prince | 180/90 |
| 4,552,399 | A | * 11/1985 | Atarashi | 296/37.12 |
| 4,619,386 | A | * 10/1986 | Richardson | 224/277 |
| 4,694,583 | A | 9/1987 | Blaney | 33/361 |
| 4,793,648 | A | * 12/1988 | Zerilli | 296/37.12 |
| 4,870,702 | A | * 9/1989 | Azzouni | 455/346 |
| 4,946,120 | A | * 8/1990 | Hatcher | 248/183.2 |
| 5,001,779 | A | * 3/1991 | Eggert et al. | 455/346 |
| 5,020,845 | A | 6/1991 | Falcoff et al. | |
| 5,086,510 | A | * 2/1992 | Guenther et al. | 455/575.9 |
| 5,102,181 | A | * 4/1992 | Pinkney | 296/37.12 |
| 5,198,831 | A | 3/1993 | Burrell et al. | 343/895 |
| 5,251,329 | A | * 10/1993 | Takagi et al. | 455/572 |
| 5,265,929 | A | 11/1993 | Pelham | 296/97.6 |
| 5,364,159 | A | 11/1994 | Kelman et al. | 296/192 |
| 5,383,138 | A | * 1/1995 | Motoyama et al. | 361/683 |
| 5,390,246 | A | * 2/1995 | Gay et al. | 381/82 |
| 5,415,554 | A | 5/1995 | Kempkers et al. | |
| D366,220 | S | 1/1996 | Sakamoto | D10/65 |
| 5,576,687 | A | 11/1996 | Blank et al. | 340/438 |
| 5,626,320 | A | 5/1997 | Burrell et al. | 248/230.6 |
| 5,812,369 | A | * 9/1998 | Hsu et al. | 361/683 |
| 5,859,628 | A | * 1/1999 | Ross et al. | 345/173 |
| 5,859,762 | A | 1/1999 | Clark et al. | 361/686 |
| 5,865,403 | A | 2/1999 | Covell | 248/27.1 |
| D409,927 | S | 5/1999 | Wiegers et al. | D10/65 |
| 5,910,882 | A | 6/1999 | Burrell | 361/681 |
| 5,917,435 | A | 6/1999 | Kamiya et al. | |
| D417,201 | S | 11/1999 | Davis | D14/343 |
| 5,996,866 | A | * 12/1999 | Susko et al. | 224/281 |
| 6,086,129 | A | 7/2000 | Gray | 296/37.8 |
| 6,094,341 | A | * 7/2000 | Lin | 361/681 |
| 6,095,470 | A | 8/2000 | Kalis | 248/309.1 |
| 6,097,448 | A | 8/2000 | Perkins | 348/837 |
| 6,102,284 | A | * 8/2000 | Myers et al. | 235/375 |
| 6,111,964 | A | 8/2000 | Ishibashi | |
| 6,125,030 | A | 9/2000 | Mola et al. | |
| 6,140,933 | A | 10/2000 | Bugno et al. | |
| 6,165,002 | A | 12/2000 | Kalis | 439/358 |
| 6,173,933 | B1 | 1/2001 | Whiteside et al. | 248/276.1 |
| D438,841 | S | 3/2001 | Smith | D12/424 |
| 6,267,428 | B1 | 7/2001 | Baldas et al. | 296/37.7 |
| 6,273,310 | B1 | * 8/2001 | Gregory | 224/275 |
| 6,295,038 | B1 | * 9/2001 | Rebeske | 345/1.1 |
| 6,338,517 | B1 | 1/2002 | Canni et al. | 296/37.8 |
| D453,300 | S | 2/2002 | Schoenfish et al. | D10/65 |
| D453,477 | S | 2/2002 | Schoenfish et al. | D10/65 |
| 6,345,179 | B1 | 2/2002 | Wiegers et al. | 455/344 |
| 6,370,631 | B1 | * 4/2002 | Schoenfish | 361/807 |
| 6,370,741 | B1 | 4/2002 | Lu | 24/523 |
| D457,445 | S | 5/2002 | Schoenfish | D10/65 |
| 6,386,965 | B1 | 5/2002 | Greenwald et al. | 454/75 |
| 6,392,877 | B1 | * 5/2002 | Iredale | 361/683 |
| D459,249 | S | 6/2002 | Schoenfish et al. | D10/65 |
| 6,409,242 | B1 | 6/2002 | Chang | |
| 6,411,502 | B1 | * 6/2002 | Burrell | 361/681 |
| 6,412,848 | B1 | 7/2002 | Ceccanese et al. | 296/37.7 |
| 6,427,959 | B1 | 8/2002 | Kalis et al. | 248/288.11 |
| 6,428,072 | B1 | 8/2002 | Moore | 396/24.34 |
| 6,464,185 | B1 | 10/2002 | Minelli et al. | 248/183.1 |
| 6,477,391 | B1 | * 11/2002 | Muramatsu et al. | 455/550.1 |
| 6,482,082 | B1 | 11/2002 | Derleth et al. | |
| 6,493,915 | B2 | 12/2002 | Zonneveld et al. | 29/401.1 |
| 6,505,121 | B1 | * 1/2003 | Russell | 701/213 |
| 6,529,381 | B1 | 3/2003 | Schoenfish | 361/725 |
| 6,633,347 | B2 | 10/2003 | Kitazawa | |
| 6,636,918 | B1 | 10/2003 | Aguilar et al. | 710/303 |
| 6,650,884 | B1 | 11/2003 | Wiegers et al. | 455/344 |
| 6,663,064 | B1 | 12/2003 | Minelli et al. | 248/205.5 |
| 6,681,176 | B2 | 1/2004 | Funk | |
| 6,709,041 | B1 | 3/2004 | Hotary et al. | 296/70 |
| 6,758,510 | B1 | 7/2004 | Starling | |
| 6,810,735 | B2 | 11/2004 | Kaneko et al. | 73/493 |
| 6,827,284 | B2 | 12/2004 | Ichishi et al. | |
| 6,928,366 | B2 | * 8/2005 | Ockerse et al. | 701/224 |
| D509,760 | S | 9/2005 | Burrell et al. | D10/65 |
| 6,955,279 | B1 | 10/2005 | Mudd et al. | 224/197 |
| 6,966,533 | B1 | 11/2005 | Kalis et al. | 248/316.4 |
| 6,976,916 | B2 | 12/2005 | Burrell et al. | 463/1 |
| D531,920 | S | 11/2006 | Mudd et al. | D10/65 |
| 7,142,980 | B1 | 11/2006 | Laverick et al. | 701/213 |
| 7,154,383 | B2 | 12/2006 | Berquist | 340/425.5 |
| 2001/0040109 | A1 | * 11/2001 | Yaski et al. | 206/320 |
| 2001/0042990 | A1 | 11/2001 | Ito et al. | 296/70 |
| 2001/0047899 | A1 | * 12/2001 | Ikeda | 180/90 |
| 2002/0003354 | A1 | * 1/2002 | Inoue et al. | 296/70 |
| 2002/0044411 | A1 | * 4/2002 | Iredale | 361/683 |
| 2002/0075136 | A1 | 6/2002 | Nakaji et al. | 340/425.5 |
| 2002/0085129 | A1 | 7/2002 | Kitazawa | 348/837 |
| 2002/0113451 | A1 | 8/2002 | Chang | |
| 2002/0133276 | A1 | 9/2002 | Onodera | 701/36 |
| 2002/0138180 | A1 | 9/2002 | Hessing et al. | |
| 2002/0149708 | A1 | 10/2002 | Nagata et al. | 348/837 |
| 2002/0152027 | A1 | 10/2002 | Allen | 701/213 |
| 2002/0163219 | A1 | 11/2002 | Clark et al. | |
| 2002/0183921 | A1 | 12/2002 | Sugiyama et al. | 701/200 |
| 2003/0055556 | A1 | 3/2003 | Hashida | |
| 2003/0068986 | A1 | * 4/2003 | Oh | 455/90 |
| 2003/0090371 | A1 | 5/2003 | Teowee et al. | |
| 2003/0127878 | A1 | 7/2003 | Gort et al. | |
| 2003/0137543 | A1 | 7/2003 | Anderson | |
| 2003/0151664 | A1 | 8/2003 | Wakimoto et al. | 348/148 |
| 2003/0168875 | A1 | * 9/2003 | Anderson et al. | 296/37.8 |
| 2003/0184111 | A1 | 10/2003 | Sturt | |
| 2003/0188103 | A1 | 10/2003 | Edwards et al. | |
| 2003/0208314 | A1 | * 11/2003 | Funk et al. | 701/207 |
| 2003/0214474 | A1 | 11/2003 | Aoki et al. | 345/87 |
| 2004/0024522 | A1 | 2/2004 | Walker et al. | 710/210 |
| 2004/0026947 | A1 | 2/2004 | Kitano et al. | |
| 2004/0041499 | A1 | 3/2004 | Donovan | |
| 2004/0196179 | A1 | 10/2004 | Turnbull | |
| 2004/0204840 | A1 | 10/2004 | Hashima et al. | 701/209 |
| 2004/0206796 | A1 | * 10/2004 | Badillo et al. | 224/577 |
| 2005/0177350 | A1 | 8/2005 | Kishikawa | 703/1 |
| 2005/0181745 | A1 | * 8/2005 | Wood et al. | 455/90.3 |
| 2007/0279856 | A1 | * 12/2007 | Bragg | 361/683 |

FOREIGN PATENT DOCUMENTS

| | | | |
|---|---|---|---|
| GB | 2405049 | * | 8/2003 |
| JP | 6-230104 | * | 8/1994 |
| JP | 9-224202 | | 8/1997 |
| JP | 9-309389 | | 12/1997 |

OTHER PUBLICATIONS

Garmin 010-10314-00 Carry case. Evidence of public use or sale given by advertisement on Amazon.com. Date first available at Amazon.com: Oct. 2, 2001. http://www.amazon.com/gp/product/B00004VX39/ref=pd_cp_e_title/002-6032276-8003210.

GPS III Owner's Manual & Reference Guide, Garmin Corporation, 1998.

GPSMAP 130 Owner's Manual and Reference, Garmin International, 1998.

Decision on Appeal dated Jul. 23, 2008 from U.S. Appl. No. 11/051,879, filed Feb. 5, 2005.

* cited by examiner

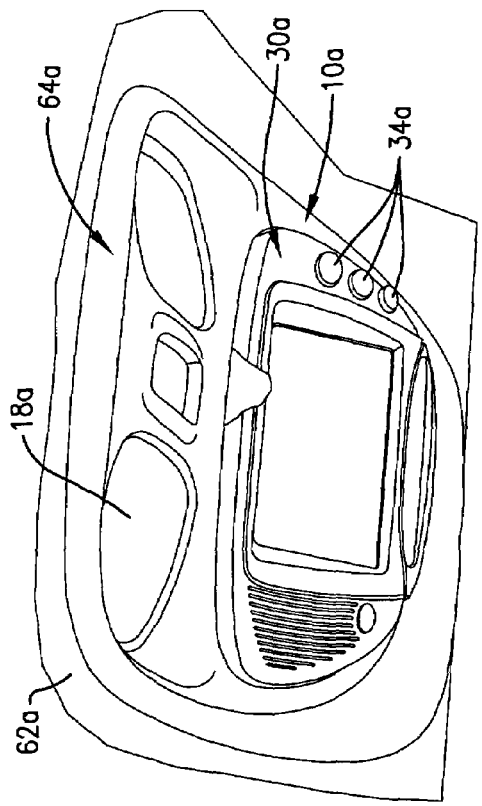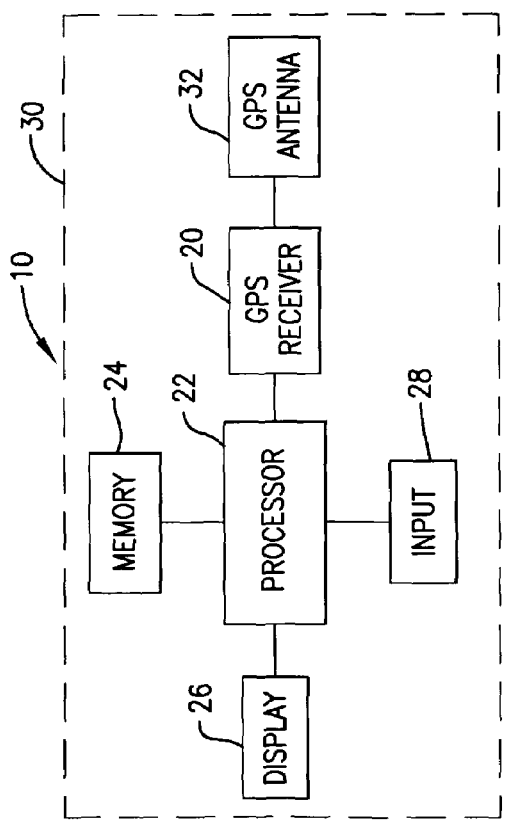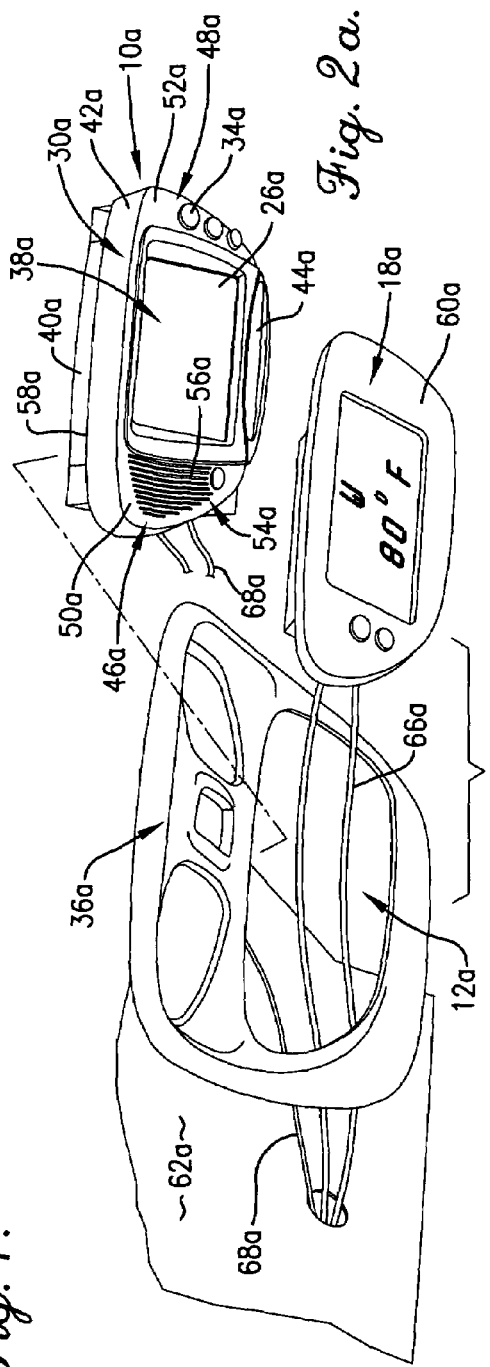

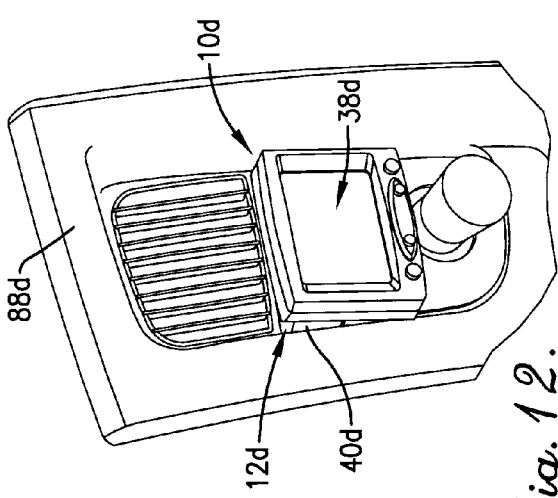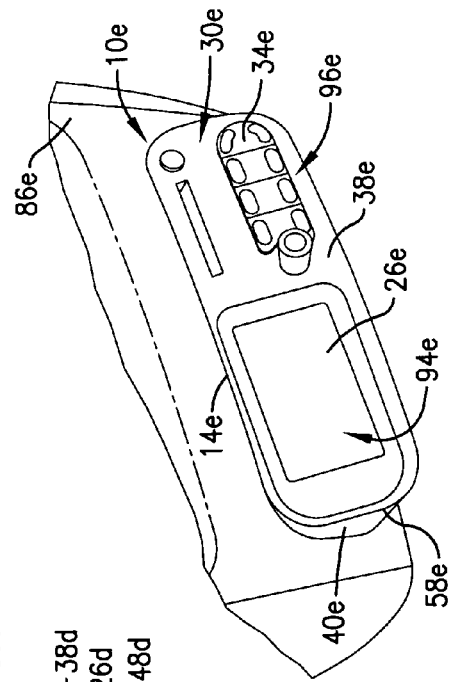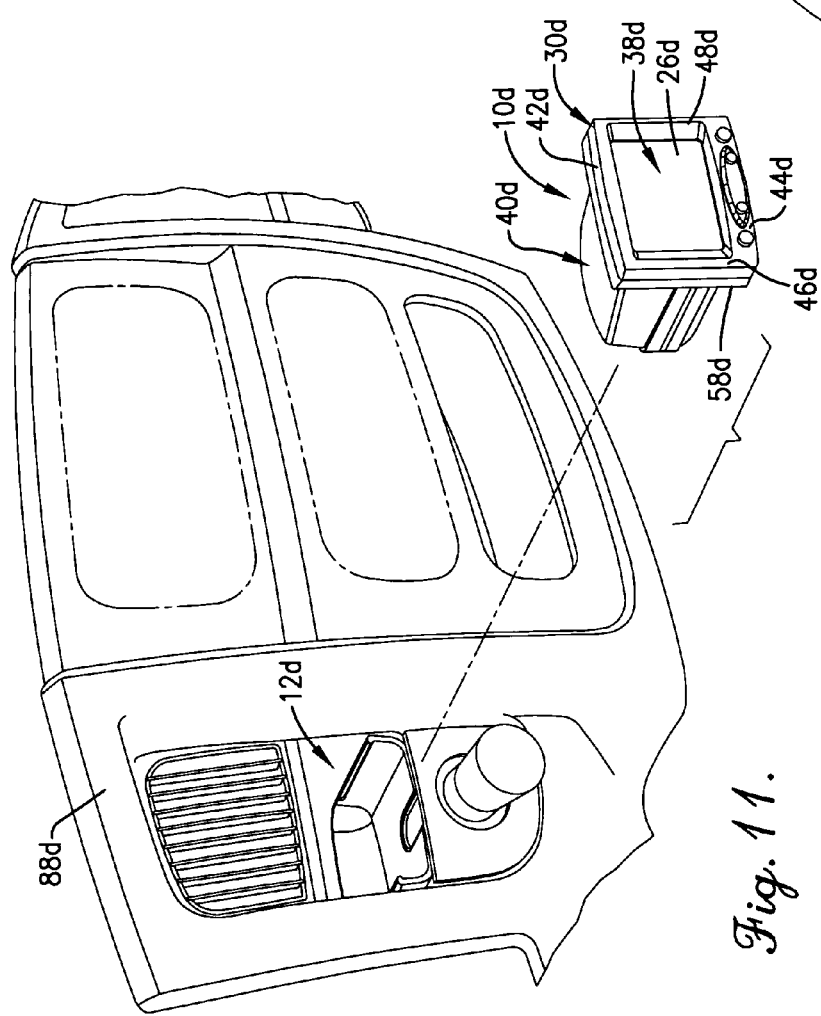

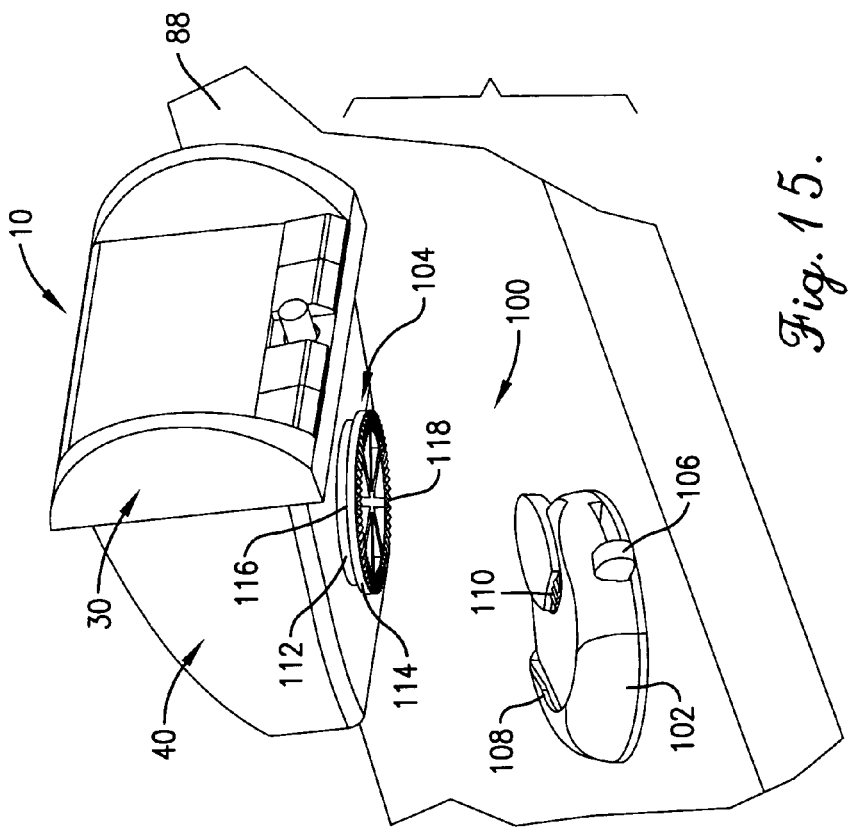
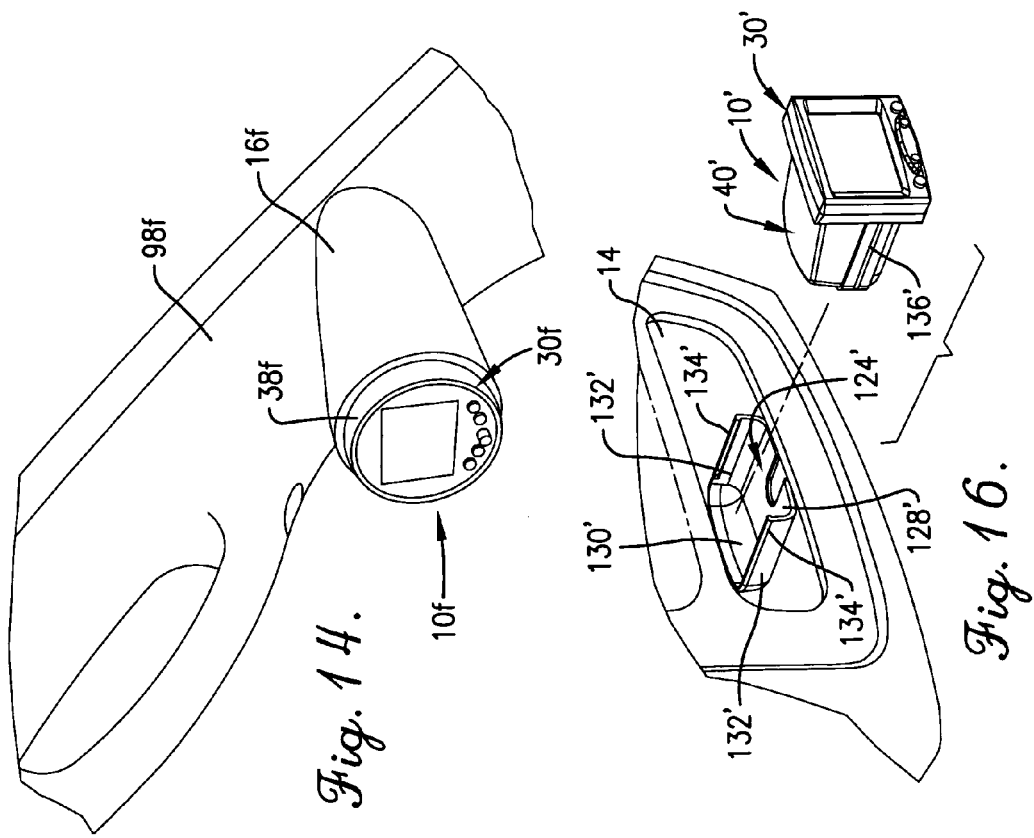

NAVIGATIONAL DEVICE FOR INSTALLATION IN A VEHICLE AND A METHOD FOR DOING SAME

RELATED APPLICATIONS

The present application is a continuation-in-part and claims priority benefit, with regard to all common subject matter, of U.S. application Ser. No. 10/411,821, filed Apr. 11, 2003, and titled "A NAVIGATIONAL DEVICE FOR INSTALLATION IN A VEHICLE AND A METHOD FOR DOING SAME," which is a continuation-in-part of U.S. application Ser. No. 10/397,662, filed Mar. 26, 2003, and titled "A NAVIGATIONAL DEVICE FOR INSTALLATION IN A VEHICLE AND A METHOD FOR DOING SAME." This application is also co-pending with U.S. application Ser. No. 10/633,045, being filed concurrently on Sep. 13, 2003, and titled "A NAVIGATIONAL DEVICE FOR MOUNTING ON A SUPPORT PILLAR OF A VEHICLE AND A METHOD FOR DOING SAME." All of the above-identified earlier-filed and co-pending applications are hereby incorporated by reference into the present application.

BACKGROUND OF THE INVENTION

1. Field of the Invention

The present invention relates to navigational devices. More particularly, the invention relates to navigational devices for use in vehicles not originally equipped with nor designed for a navigational device.

2. Description of the Prior Art

Navigational devices, such as global positioning satellite ("GPS") units, are becoming increasingly popular options in automobiles and other vehicles. Such navigational devices can determine a vehicle's current location, display a city map or other driving area, and provide directions.

Many luxury vehicles are now either originally equipped with navigational devices or are designed to accept original equipment manufacture ("OEM") navigational devices as a dealer option. However, the popularity of navigational devices has spread beyond those who can afford luxury vehicles. Unfortunately, vehicle manufacturers have been slow to add factory or dealer-installed navigational devices to lower-priced vehicles, because it often takes three to six years to implement a design change in a vehicle model. Also, since implementing such a design change can be extremely expensive, it has been thus far impractical and too expensive to equip many vehicles with OEM navigational devices.

Those wishing to use a navigational device in a vehicle that is not equipped with nor configured to receive such a device often choose to use a portable, hand-held navigational device. One such navigational device is sold by Garmin International, Inc., under the trade name ETREX. These navigational devices are usually intended to be used in a multiplicity of locations, one of which may be the vehicle. However, because these navigational devices are not specially designed for use in vehicles, users are forced to store the navigational devices in a glove compartment, a vehicle console, an empty passenger seat, or on a dashboard. Each of these locations presents accessibility and viewing problems. For example, if the navigational device is tossed onto the dashboard of the vehicle, it can slide around, causing damage to the device and the vehicle. Additionally, use of the device requires a user to hold it in one hand and drive with the other hand, clearly causing safety concerns and problems. Furthermore, the portable navigational device may become lost in the many open spaces and cracks of the vehicle.

Mounts have been designed to attach handheld navigational devices to vehicle dashboards to alleviate some of these problems. However, such mounts often obstruct the view of the driver and/or passenger of the vehicle. Additionally, the mounts clutter the dashboard of the vehicle and are not aesthetically pleasing. Further, mounts permanently installed on the dashboard leave holes and other scarring marks. If the mount is removably installed on the dashboard, it often becomes loose due to the vibrations of the vehicle.

Accordingly, there is a need for an improved navigational device that overcomes the limitations of the prior art. More particularly, there is a need for a navigational device that can be used in a vehicle not originally equipped with a navigational device without need for a dashboard mount. Additionally, there is a need for a navigational device that is easily accessible and viewable by a driver of the vehicle.

SUMMARY OF THE INVENTION

The present invention solves the above-described problems and provides a distinct advance in the art of navigational devices. More particularly, the present invention provides a navigational device that may be removably or permanently mounted in a vehicle not designed to receive a navigational device, without requiring use of a dashboard mount.

The navigational device of the present invention broadly includes a navigation component such as a global positioning satellite ("GPS") receiver; a processor coupled with the navigation component; a memory coupled with the processor; a display; an input; and a housing for housing the navigation component, the processor, and the memory. In some embodiments, the housing is importantly sized and configured to be removably mounted in an open port or existing opening of a vehicle. Due to the many different makes and models of vehicles, the housing of the navigational device consequently embodies a plurality of sizes and shapes.

In other embodiments, the navigational device is a conventional, portable navigational device and thus, is not particularly sized and configured to fit within an existing location in the vehicle.

In a first preferred embodiment of the present invention, the open port results from removal of a non-navigational component in an overhead console of the vehicle. The overhead console may be any standard overhead console formed during manufacture of the vehicle and positioned on an interior roof section of the vehicle. The overhead console houses at least one non-navigational component, such as a display screen displaying an outside temperature and bearing of the vehicle. The non-navigational component is removed from the overhead console, leaving the open port. The navigational device, which is sized and configured to the dimensions of the open port, is then mounted or installed in the open port.

Alternatively, the overhead console itself may be removed from the vehicle, leaving an open area. A replacement overhead console sized and configured to fit within the open area resulting from removal of the first original overhead console is then installed in the open area. The replacement overhead console is substantially the same size and shape as the overhead console and includes the navigational device.

In a second preferred embodiment, an open port results from removal of an air vent unit installed in the vehicle. Similar to the first preferred embodiment, a navigational device is sized and configured to the dimensions of the open port. The housing of this embodiment is provided with insulation to protect the navigational device from excessive temperatures created by the vehicle's heating and cooling system. Further, an air grate or vent may be provided around a front face of the housing to minimize potential air flow noise resulting from removal of the air vent unit.

In a third preferred embodiment, an open port results from removal of a non-navigational component in a middle console of the vehicle. The middle console is positioned directly under a dashboard of the vehicle and generally center of the vehicle. Similar to the first preferred embodiment, a navigational device is sized and configured to the dimensions of the open port, so it may replace the non-navigation component in the middle console.

In a fourth preferred embodiment, an open port results from removal of a non-navigational component in the dashboard of the vehicle. Similar to the first preferred embodiment, a navigational device is sized and configured to the dimensions of the open port, so it may replace the non-navigation component in the dashboard.

In a fifth preferred embodiment, an empty recess formed during manufacture of the vehicle is located. The empty recess may be, for example, a recess designed to hold objects such as eyeglasses, compact discs, a compact disc player, a garage door opener, or other miscellaneous articles. A navigational device, which is sized and configured to fit within the empty recess, is then mounted in the empty recess.

In a sixth preferred embodiment, a hollowed receptacle is secured on a pillar of a door frame of the vehicle. A navigational device, which is sized and configured to fit within the hollowed receptacle, is then mounted in the hollowed receptacle. Alternatively, the pillar is replaced with a substantially similar replacement pillar that includes the navigational device mounted in the hollowed receptacle.

Seventh and eighth preferred embodiments are disclosed in U.S. patent application Ser. No. 10/411,821, filed Apr. 11, 2003, which is incorporated herein by reference.

In a ninth preferred embodiment, a conventional, portable navigational device is mounted within a cradle, which is in turn mounted within a carrying case. The case is preferably sized and configured to be positioned within a pre-existing tray or other recess of the vehicle, such as a coin storage tray on a dashboard of the vehicle. When desired, the case may be removed, such that the navigational device may be used outside the vehicle. The navigational device may be powered by internal batteries or may plug into the case, which in turn receives power from the vehicle. Similarly, the navigational device may connect to a data terminal in the case, which in turn connects to a data bus in the vehicle.

In a tenth preferred embodiment, a conventional, portable navigational device is mounted within a cradle that is pivotably hinged within a pre-existing tray or recess of the vehicle. The cradle is operable to pivot the navigational device from a generally flat, nested position within the tray upwards to a viewing position approximately perpendicular to the flat position. A hinged lid or cover may be provided to cover the navigational device and cradle when in the flat, nested position and is operable to rest on a top of the navigational device when the navigational device and cradle are in the viewing position. The navigational device may be easily removed from the cradle for use outside the vehicle. As with the previous embodiment, the navigational device may be connected to the power and data buses of the vehicle through connectors in the cradle.

In each of these embodiments and other embodiments described herein, the navigational device may be permanently mounted in the open port, empty recess, or hollowed receptacle or removably mounted therein. Moreover, the navigational device may be provided with wires or adapters for connecting to the vehicle's power source and/or other electronic components in the vehicle, such as a display screen or vehicle computer. Alternatively, the navigational device may use wires or adapters of the removed non-navigational component to connect the navigational device to the power source or the other electronic components. Further, the navigational device may be provided with at least one battery for powering the navigational device.

By constructing the navigational device as described herein, numerous advantages are realized. For example, because the navigational device is sized and configured to replace a non-navigational component originally installed in a vehicle, it may be installed in any vehicle, regardless of whether the vehicle was designed to receive such a device. Moreover, the navigational device may be installed at any time, not just during manufacture of the vehicle or at the dealer when the vehicle is sold. Thus, a user of the vehicle need not purchase a luxury automobile to enjoy the benefits of a navigational device installed in the vehicle.

Further, the navigational device may be mounted or installed in the vehicle without replacing the dashboard or the middle console of the vehicle. Since replacing the dashboard or the middle console of the vehicle is clearly expensive, the present invention provides an inexpensive alternative to installing a navigational device in a vehicle.

Additionally, because the navigational device is designed to replace a component which was designed to be viewed and/or operated by a user, the navigational device will typically be positioned in an easily accessible and viewable area. This limits the unsafe practice of holding the navigational device while driving. Further, the navigational device and the vehicle are not harmed from the navigational device being tossed around within the vehicle.

Furthermore, because the housing of the navigational device is designed to match the dimensions of the open port, empty recess, or hollowed receptacle so as to fit substantially within the open port, empty recess, or hollowed receptacle, installation of the navigational device does not adversely affect the aesthetics of the vehicle.

The ninth preferred embodiment provides particular advantages because it allows the navigational device to be stored within and protected by the carrying case, and the carrying case may be easily and quickly removed from the tray. The navigational device may then be used in other locations outside the vehicle. Further, because the carrying case is sized to fit within the tray, a non-navigational component of the vehicle need not be removed. Further yet, because the case is sized and configured to receive a conventionally sized navigational device, a specially sized and configured navigational device is not required as with the other embodiments.

The tenth preferred embodiment is advantageous because it permits the conventional, portable navigational device to be pivotably mounted directly within the tray. Further, the tenth embodiment provides for a cover for the navigational device to protect it from the elements, such as water and dust, and to keep the navigational device out of sight.

These and other important aspects of the present invention are described more fully in the detailed description below.

BRIEF DESCRIPTION OF THE DRAWING FIGURES

Preferred embodiments of the present invention are described in detail below with reference to the attached drawing figures, wherein:

FIG. 1 is a block diagram of the components of a navigational device constructed in accordance with a first, second, third, fourth, fifth, sixth, seventh, eighth, and ninth preferred embodiments of the present invention;

FIG. 2a is an exploded fragmentary isometric view of the first preferred embodiment of the present invention illustrating a non-navigational component housed in an open port of an overhead console and a navigational device sized and configured to be mounted within the open port;

FIG. 2b is a fragmentary isometric view of a replacement overhead console including the navigational device, particularly illustrating the replacement console having substantially the same size and shape as the overhead console of FIG. 1a;

FIG. 11 is an exploded fragmentary isometric view of the fourth preferred embodiment of the present invention illustrating a navigational device installed in an open port resulting from removal of a non-navigational component in a dashboard of the vehicle, particularly illustrating the navigational device adapted to be removably mounted in the open port via a cradle;

FIG. 12 is a fragmentary isometric view of the navigational device of FIG. 11 shown removably mounted within the open port;

FIG. 13 is a fragmentary isometric view of the fifth preferred embodiment of the present invention, particularly illustrating a navigational device inserted within an empty recess originally empty;

FIG. 14 is a fragmentary isometric view of the sixth preferred embodiment of the present invention illustrating a navigational device mounted within a hollowed receptacle secured on a pillar of a door frame of the vehicle;

FIG. 15 is an isometric view depicting the navigational device of FIG. 6 being removably mounted on the dashboard of the vehicle, particularly illustrating a second mounting unit for removably mounting the navigational device on the dashboard;

FIG. 16 is an exploded fragmentary view of the navigational device of FIGS. 11 and 12 mounted in an open port, particularly illustrating the navigational device removably mounted within the open port via a cradle;

Figure 18:
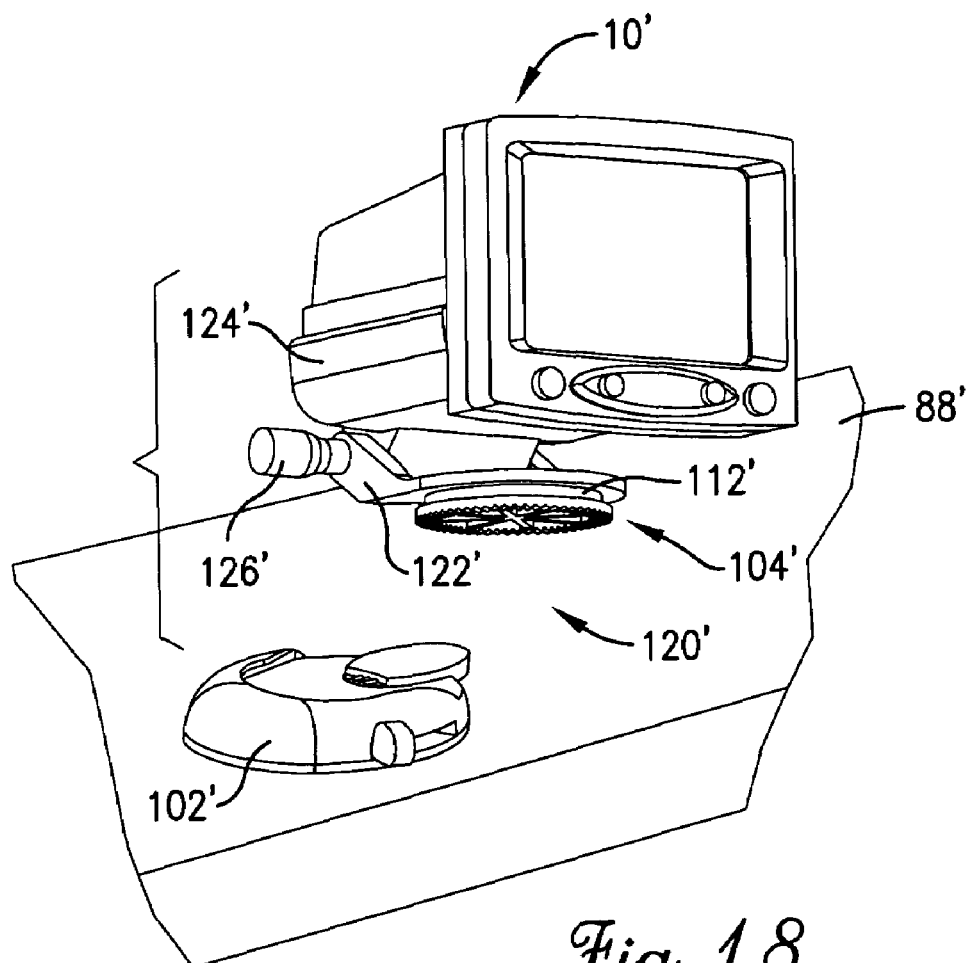
Figure 19:
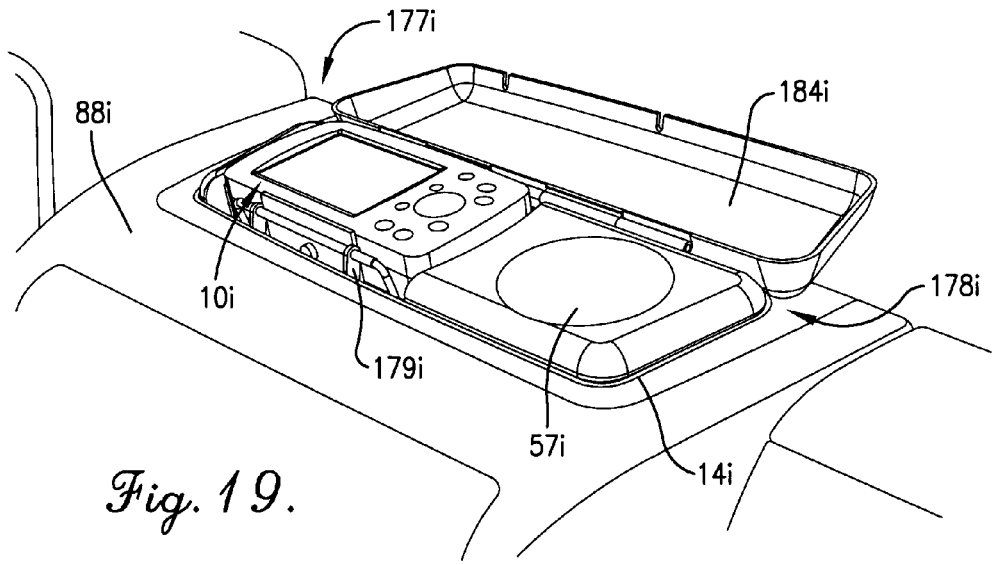
Figure 20:
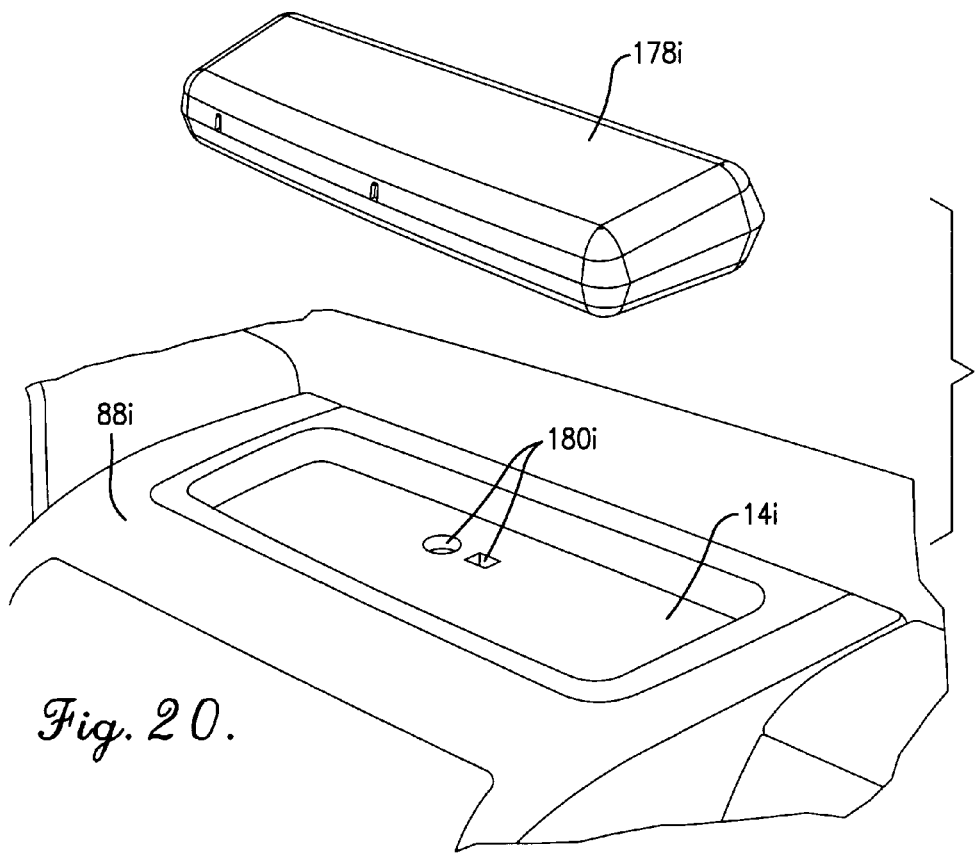
Figure 21:
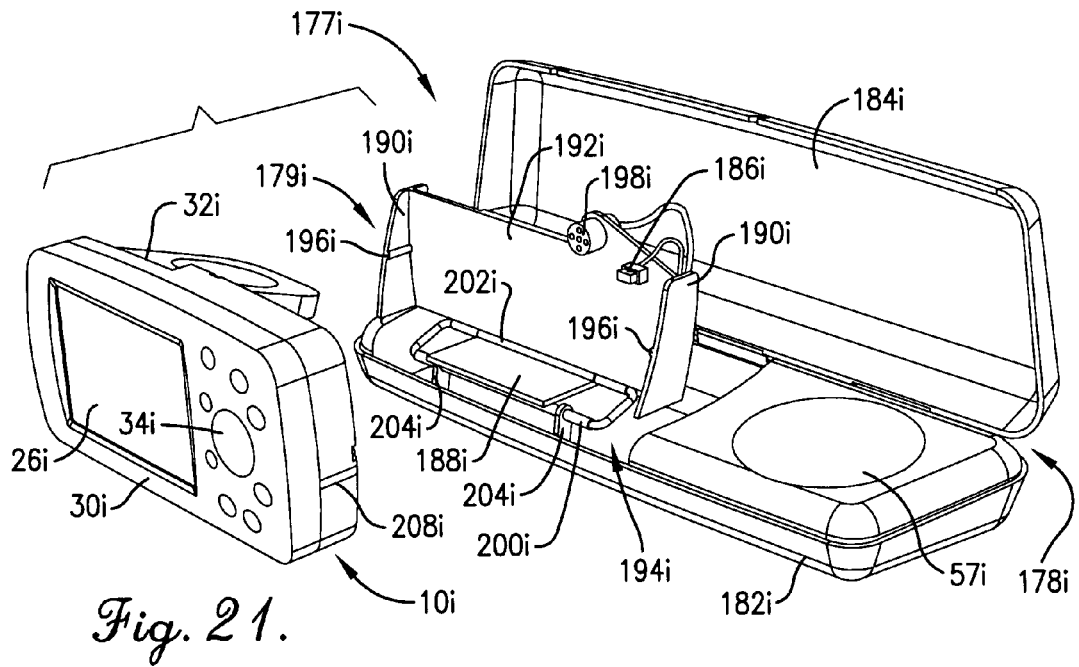
Figure 22:
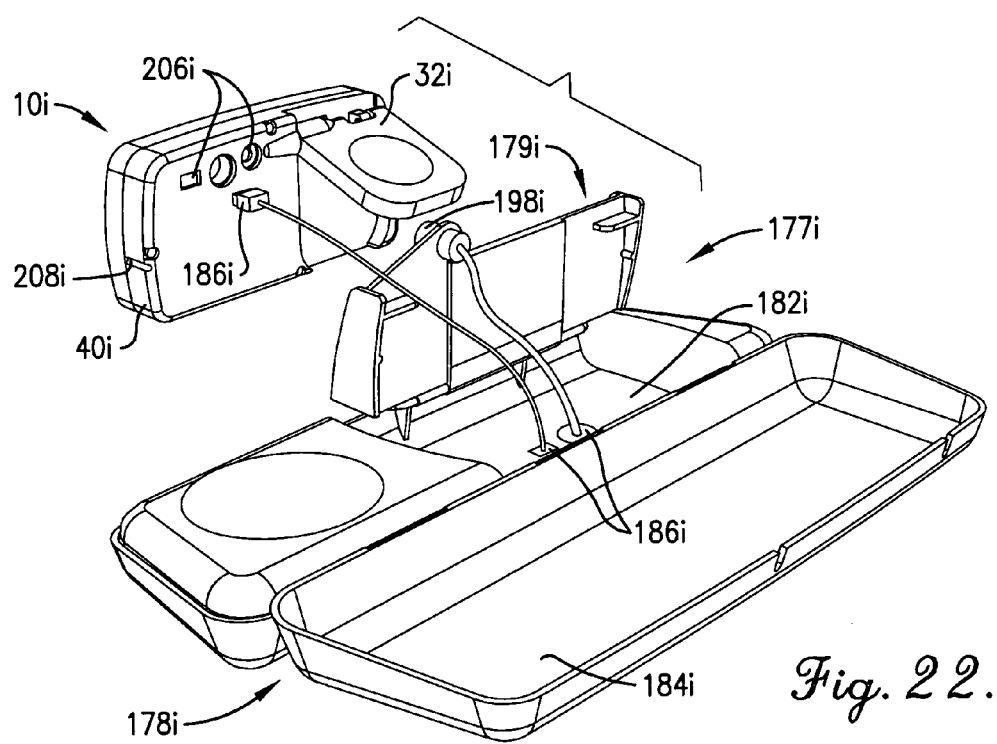
Figure 23:
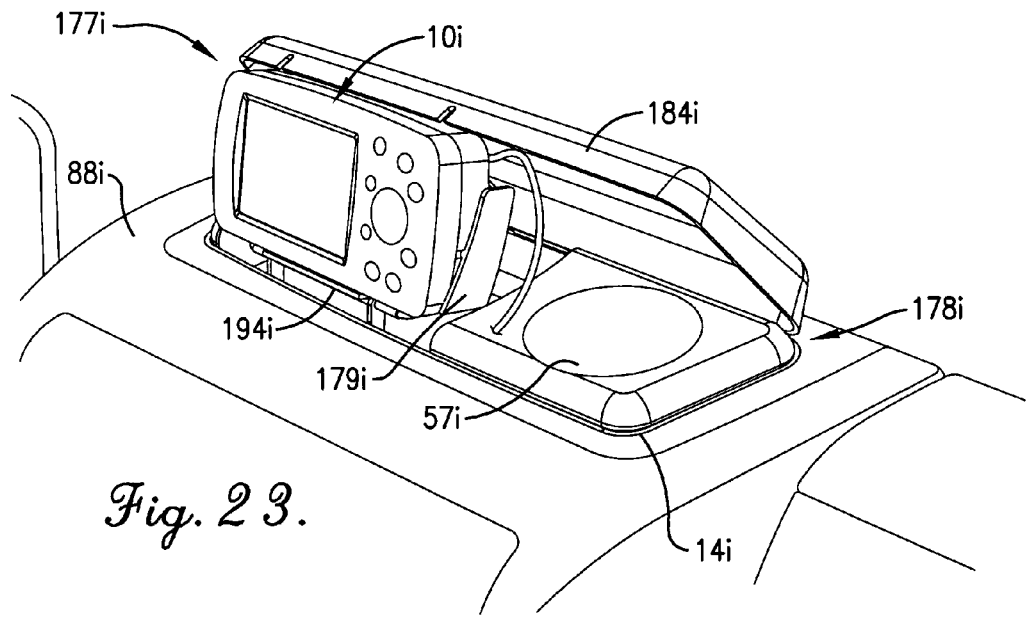
Figure 24:
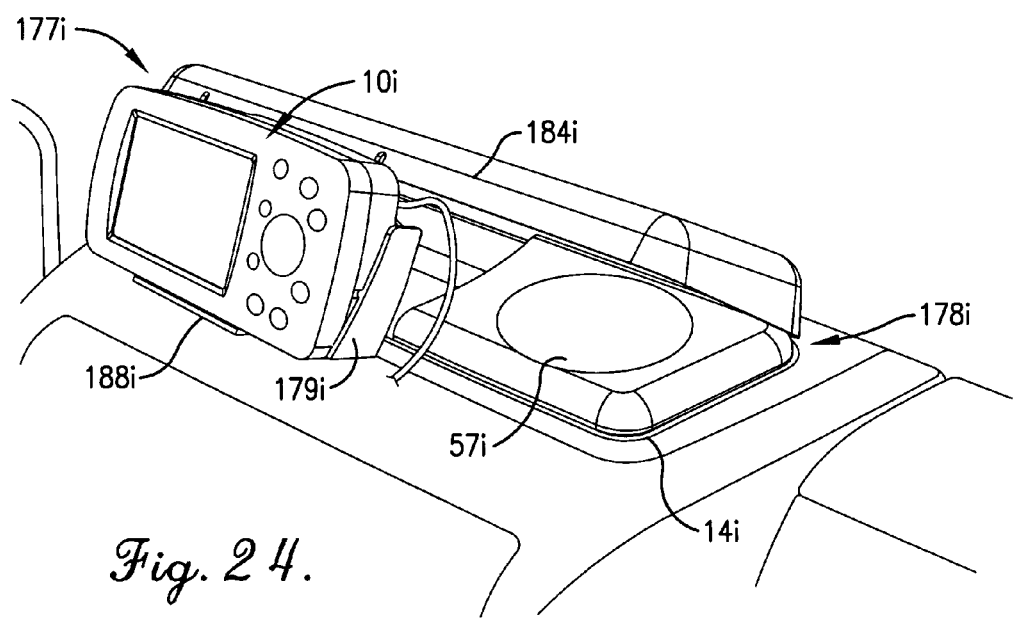
Figure 25:
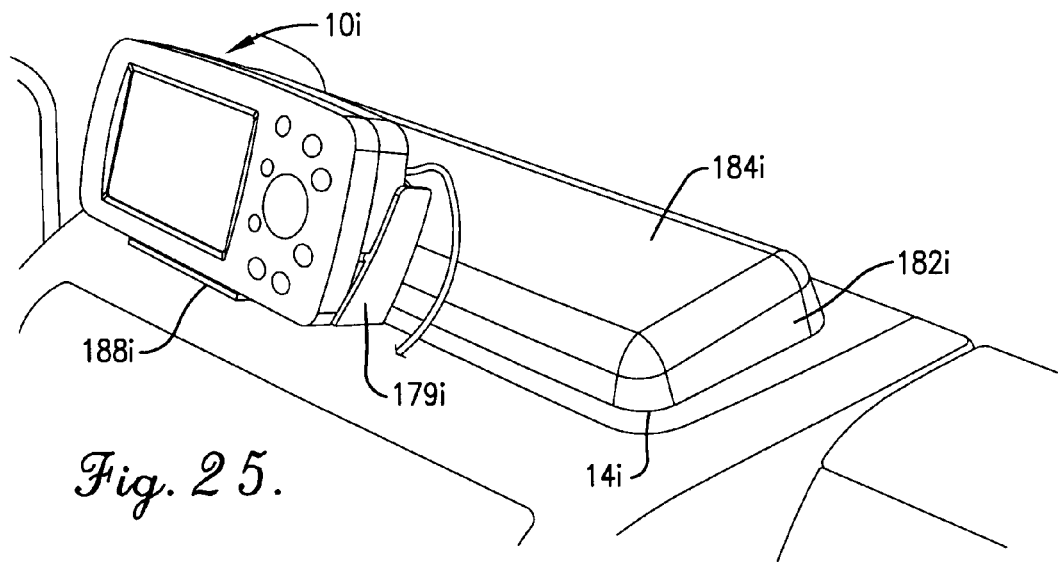
Figure 26:
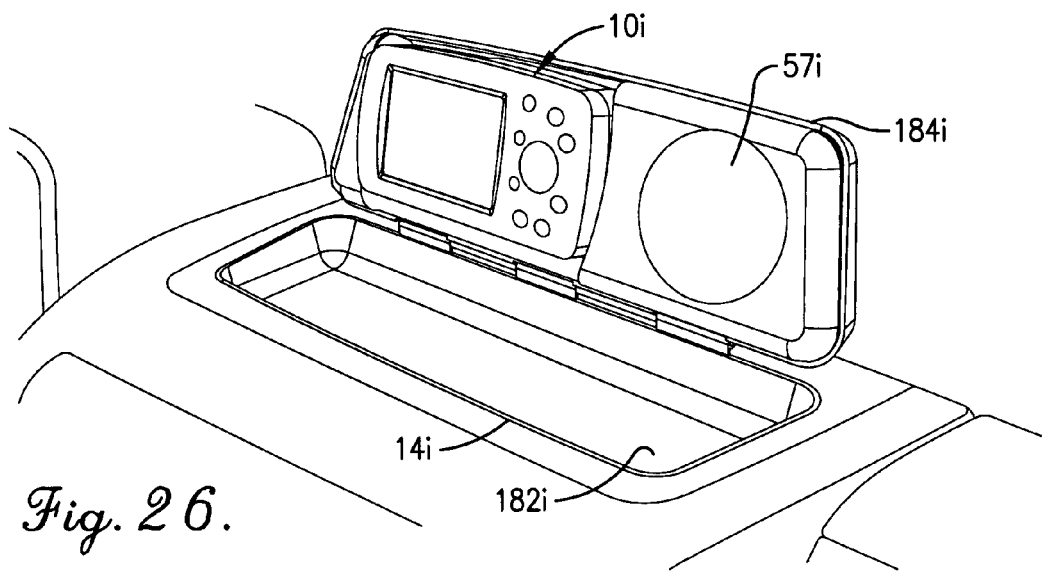
Figure 27:
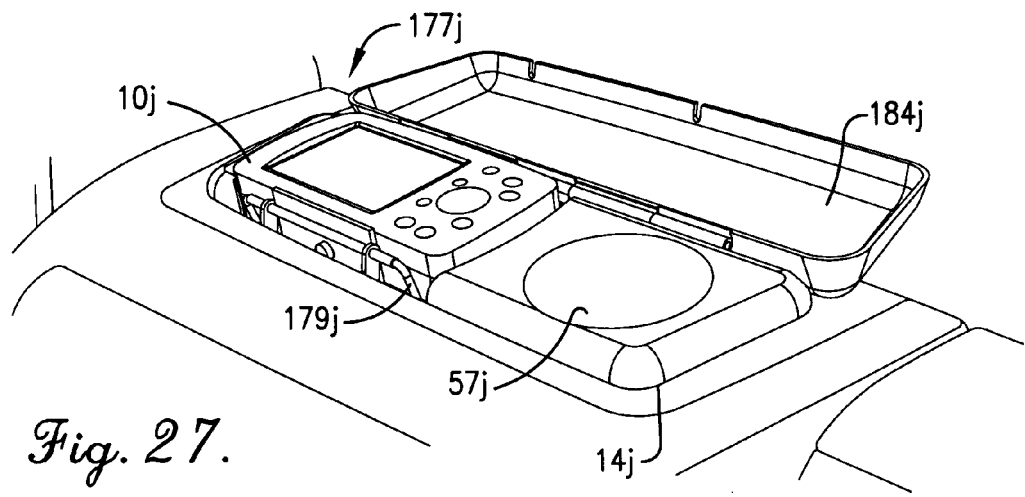

FIG. 18 is an exploded fragmentary isometric view of the navigational device of FIGS. 11 and 12, particularly illustrating a third mounting unit substantially similar to the second mounting unit of FIG. 15 but for the cradle, wherein the navigational device is adapted to be removably mounted on the dashboard of the vehicle via the cradle, such that the navigational device may be removably mounted within the open port illustrated in FIG. 11, the hollowed receptacle illustrated in FIG. 14, and on the dashboard of the vehicle;

FIG. 19 is an isometric view of a navigation assembly constructed in accordance with a ninth preferred embodiment of the invention, particularly illustrating a navigational device and speaker mounted within a carrying case sized and configured to fit within a tray on a dashboard of the vehicle;

FIG. 20 is an exploded isometric view of the carrying case of the ninth embodiment;

FIG. 21 is an exploded isometric view of a hinged cradle of the navigation assembly of the ninth embodiment, wherein the cradle is mounted within the carrying case and sized and configured to receive the navigational device;

FIG. 22 is an exploded isometric view of a rear of the navigational device of the ninth embodiment, particularly illustrating electrical connections for connecting the navigational device to a power source and a data source supplied by the vehicle;

FIG. 23 is an isometric view of the navigational device of the ninth embodiment positioned within the cradle and pivoted upwards for viewing by a driver of the vehicle;

FIG. 24 is an isometric view of an alternative viewing position of the navigational device of the ninth embodiment by the driver of the vehicle;

FIG. 25 is an isometric view of an even further alternative viewing position of the navigational device of the ninth embodiment, particularly illustrating the case in a closed position;

FIG. 26 is an isometric view of an alternative of the ninth preferred embodiment, particularly illustrating the navigational device and speaker positioned within a lid of the case; and FIG. 27 is an isometric view of a navigation assembly constructed in accordance with a tenth preferred embodiment of the present invention, particularly illustrating a cradle pivotably hinged directly within a tray, a navigational device sized and configured to mount within the cradle, a speaker mounted within the tray, and a hinged cover operable to cover the navigational device and speaker.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, a navigational device 10 constructed in accordance with several preferred embodiments of the present invention is illustrated. In some embodiments, the navigational device 10 is provided for insertion or mounting in an open port 12, an empty recess 14, or a hollowed receptacle 16 of a vehicle. The open port 12 results from removal of a non-navigational component 18 installed in the vehicle during manufacture or dealer preparation of the vehicle. The empty recess 14 is formed during manufacture of the vehicle and is designed to hold objects such as eyeglasses, compact discs, a compact disc player, a garage door opener, or other miscellaneous articles. The hollowed receptacle 16 is mounted within the vehicle, and the navigational device is mounted within the receptacle.

In other embodiments, the navigational device 10 is configured for mounting in a tray or other recess of the vehicle and therefore, does not require removal of a non-navigation component. In these embodiments, the navigational device 10 is preferably a conventional, portable device 10 and is not specially sized or configured to mount within an existing location in the vehicle.

The navigational device 10 is thus uniquely suited for installation in a vehicle which does not originally contain nor is designed to receive a navigational device. Examples of vehicles in which the navigational device 10 may be installed include automobiles, motorcycles, boats, airplanes, and other transportation machines for moving persons or cargo.

As illustrated in FIG. 1, the navigational device 10 broadly comprises a navigation component 20; a processor 22 coupled with the navigation component 20; a memory 24 coupled with the processor 22; a display 26; an input 28; and a housing 30 for housing the navigation component 20, the processor 22, and the memory 24.

The navigation component 20 is preferably a global positioning satellite ("GPS") receiver, although other navigation components may be used. The preferred navigation component 20 is operable to receive satellite signals from a plurality of satellites using a GPS antenna 32, such as a GPS patch antenna 32, which is electronically coupled with the navigation component 20. The navigation component 20 is electronically coupled with the processor 22, and the processor 22 is operable to calculate a location of the navigational device 10 as a function of the satellite signals.

The memory 24 is preferably coupled with the processor 22 but may instead be coupled with a processor (not shown) of the vehicle. Cartographic data is preferably stored in the memory 24 and operable to be accessed by the processor 22 for viewing on the display 26 of the navigational device 10. The input 28 allows for control of the processor 22 using a plurality of control buttons 34, as illustrated in FIG. 2b. The control buttons 34 may be used to operate drop-down menus to select and input names or other identifiers. Alternatively, the input 28 may be an alphanumeric keypad (not shown), such as a telephone keypad, which may be used to type in names, identifiers, and text, or the input 28 may be a touch screen (not shown).

The housing 30 may be formed of plastic, fiberglass, or any other suitable material. Importantly, the housing 30 is sized and configured to mount within the open port 12, the empty recess 14, or the hollowed receptacle 16. Since the present invention may be used in a plurality of different types of vehicles, the open port 12, empty recess 14, and hollowed receptacle's 16 shape and size will be unique to the make and model of the vehicle. Thus, various navigational devices 10 of differing sizes and configuration are embodied in the present invention and will be described below.

Figure 3:
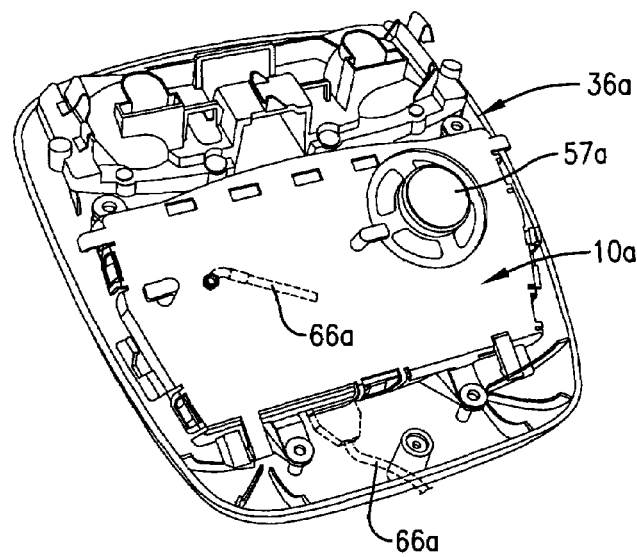
FIG. 3 is a rear isometric view of the overhead console of FIG. 1a illustrating the navigational device and the wires of the removed non-navigational component in broken line.

FIGS. 2a, 2b, 3, 4, and 5 illustrate a navigational device 10a constructed in accordance with a first preferred embodiment, which includes a housing 30a sized and configured to fit within an open port 12a resulting from removal of a non-navigational component 18a from an overhead console 36a of a vehicle. The non-navigational component 18a may be, for example, a light, an information display, an air vent unit, a clock, a compass, or a holder for holding eyeglasses, a garage door opener, or other miscellaneous articles. The housing 30a includes a front, frame-shaped section 38a and an attached rear, box-shaped section 40a. The front section 38a includes upper and lower walls 42a,44a and left and right side walls 46a,48a, which together define an enclosed area for receiving a display 26a. Control buttons 34a may be positioned on front faces 50a,52a of the left and right side walls 46a,48a, as depicted in FIG. 2a, or anywhere else on the housing 30a. The front face 50a of the left side wall 46a also preferably includes a series of longitudinal slots 54a which define a grill 56a, as illustrated in FIG. 2a, for use with a speaker 57a, as illustrated in FIG. 3, that may be coupled with a processor (not shown) for providing audible navigation instructions.

The rear, box-shaped section 40a is attached to a rear face 58a of the front section 38a and houses a navigation component (not shown), the processor (not shown), and a memory (not shown), although a processor (not shown) and a memory (not shown) of the vehicle may alternatively be connected to the navigational device 10a. The housing 30a of the navigational device 10a is preferably approximately six inches wide, four inches high, and five inches deep, although the width may range between two inches and twelve inches, the height may range between two inches and twelve inches, and the depth may range between two inches and twelve inches.

Figure 4:
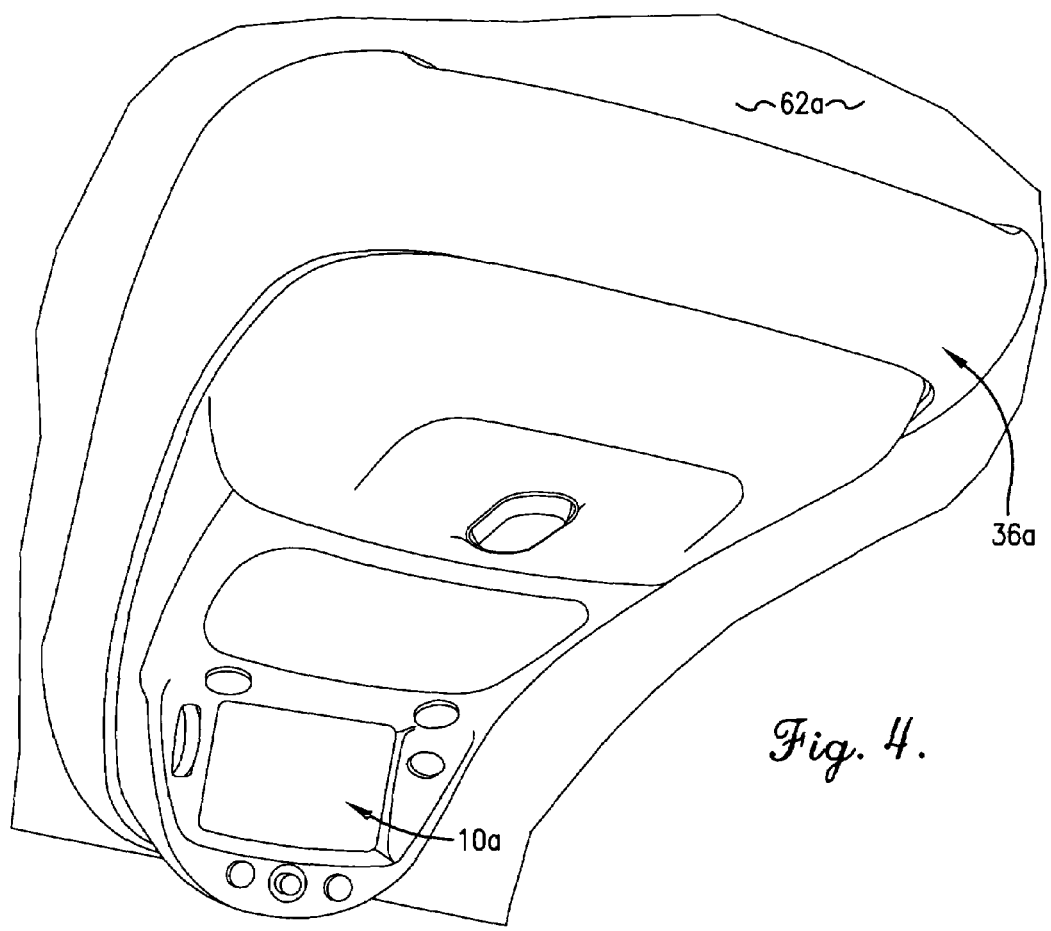
FIG. 4 is fragmentary isometric view of an alternative shape and size of the overhead console and the navigational device installed in the overhead console.
Figure 5:
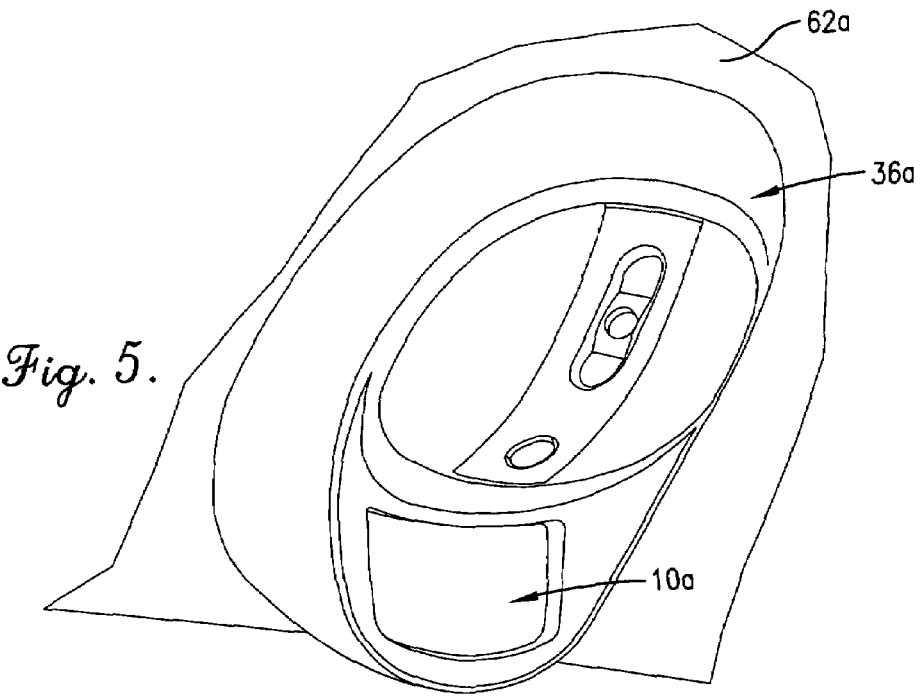
FIG. 5 is a fragmentary isometric view of a further alternative shape and size of the overhead console and the navigational device installed in the overhead console.

The overhead console 36a is any standard overhead console formed during manufacture of the vehicle, generally positioned on an interior roof section of the vehicle, and containing at least one non-navigation component 18a. The overhead console 36a generally comprises a main body 60a formed to fit with and be secured within an open area 62a of the vehicle, such as the interior roof section. The overhead console 36a is preferably within reach and within view of both a driver and a passenger of the vehicle. Additionally, the overhead console 36a is preferably positioned so as to not obstruct the driver's view in a rearview mirror. The overhead console's 36a shape and size will be unique to the make and model of each vehicle, as also illustrated in FIGS. 2a, 4, and 5.

To retrofit the vehicle with the first preferred embodiment of the present invention, the non-navigational component 18a is first removed from the overhead console 36a, as illustrated in FIG. 2a. Removal of the non-navigational component 18a results in the open port 12a. The navigational device 10a is then installed in the open port 12a of the overhead console 36a, as also illustrated in FIG. 2a. The navigational device 10a is importantly sized and configured to fit substantially within the open port 12a of the overhead console 36a. A front face of the navigational device 10a is preferably positioned generally flush with a face of the open port 12a, as also illustrated in FIGS. 4 and 5.

In an alternative of the first preferred embodiment, the overhead console 36a is entirely removed from the open area 62a, as illustrated in FIG. 2a, and a replacement overhead console 64a including the navigational device 10a is installed in the open area 62a, as illustrated in FIG. 2b. In this alternative, the overhead console 36a illustrated in FIG. 2a is formed during manufacture of the vehicle and does not originally include the navigational device 10a. The replacement overhead console 64a, as illustrated in FIG. 2b, may be substantially similar in shape and size, although not necessarily identical, to the overhead console 36a illustrated in FIG. 2a, but for differences necessary to accommodate the navigational device 10a. The replacement overhead console 64a, as illustrated in FIG. 2b, is then mounted within the open area 62a. The replacement overhead console 64a may include at least one non-navigational component 18a. Since the replacement overhead console 64a is formed after manufacture of the vehicle and includes the navigational device 10a, then the replacement overhead console 64a will necessarily not include at least one non-navigational component 18a that was included in the overhead console 36a. Alternatively, the non-navigational component 18a may be combined with the navigational device 10a, such that the replacement overhead console 64a includes all non-navigational components 18a that were included in the overhead console 36a, as discussed in more detail below. In a further alternative, two or more non-navigational components 18a from the overhead console 36a may be combined with regard to space such that the replacement overhead console 64a includes all non-navigational components 18a that were included in the overhead console 36a.

The navigational device 10a may also be connected to a power source (not shown) of the removed non-navigational component 18a. If the power source is supplied by the vehicle, then any wires 66a associated with the removed non-navigational component 18a, as illustrated in FIGS. 2a and 3, are connected to the newly installed navigational device 10a, as illustrated in FIG. 3. The navigational device 10a may include wires or other adapters 68a configured to connect with the existing wires 66a that were previously connected to the non-navigational component 18a. Alternatively, the navigational device 10a may include wires or other adapters 68a configured to connect directly with the power source supplied by the vehicle.

Further, the navigational device 10a may be connected to an information source (not shown) of the vehicle. For example, if the removed non-navigational component 18a was operable to display information about the vehicle, as illustrated in FIG. 2a, such as the outside temperature, the inside temperature of the vehicle, the vehicle's mileage, the vehicle's speed, the direction in which the vehicle is traveling, and the amount of mileage remaining based on the vehicle's power source, then the newly installed navigational device 10a may be connected to the information source of the non-navigational component 18a. The navigational device 10a is then operable to display the information formerly displayed by the non-navigational component 18a, in conjunction with displaying navigational information.

FIGS. 6-9 illustrate a navigational device 10b in accordance with a second preferred embodiment, which includes a housing 30b sized and configured to fit within an open port 12b resulting from removal of an air vent unit 70b from a vehicle. As with the first preferred embodiment, the size and shape of the open port 12b will be unique to the make and model of the vehicle, and thus, the second preferred embodiment provides for a plurality of shapes and sizes of navigational devices 10b.

Figure 6:
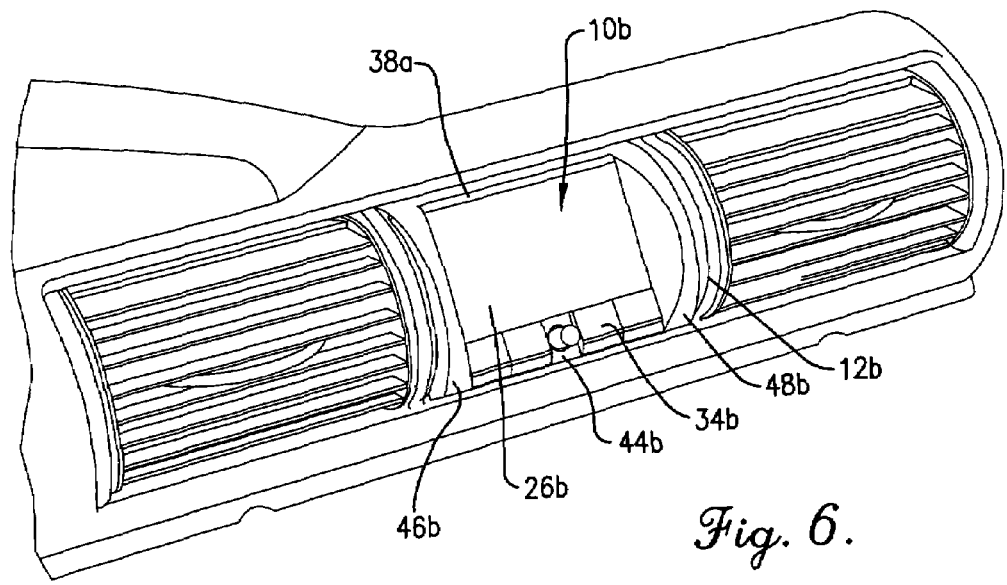
FIG. 6 is a fragmentary isometric view of the second preferred embodiment of the present invention illustrating a navigational device installed in an open port resulting from removal of a vehicle air vent unit.
Figure 7:
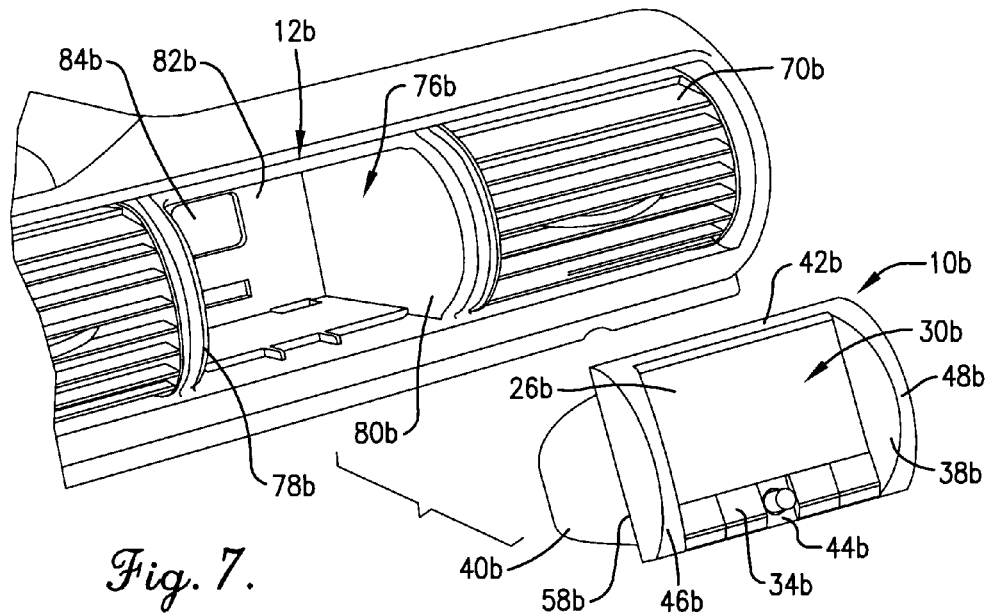
FIG. 7 is an exploded fragmentary isometric view of the navigational device and the open port of FIG. 6, particularly illustrating a first mounting unit for permanently mounting the navigational device in the open port.

As illustrated in FIGS. 6 and 7, the housing 30b is preferably approximately six inches wide, four inches high, and five inches deep, although the width may range between two inches and twelve inches, the height may range between two inches and twelve inches, and the depth may range between two inches and twelve inches. Similar to the first embodiment, the housing 30b includes a front, frame-shaped section 38b and an attached rear, box-shaped section 40b. The front section 38b includes upper and lower walls 42b,44b and left and right side walls 46b,48b which together define an enclosed area for receiving a display 26b. Control buttons 34b are positioned on the lower wall 44b. The left and right side walls 46b,48b are generally arcuate when viewed from a side and preferably project outwards from the display 26b so as to match the contours of the open port 12b.

The rear section 40b is attached to a rear face 58b of the front section 38b and houses a navigation component (not shown), a processor (not shown), and a memory (not shown). To facilitate the navigational device 10b fitting within the open port 12b, the rear section 40b of the housing 30b may be minimized. As illustrated in FIG. 7, the rear section 40b of the housing 30b tapers to a smaller size relative to an area of the front section 38b of the housing 30b, which allows the housing 30b to fit within relatively small open ports 12b.

Figure 8:
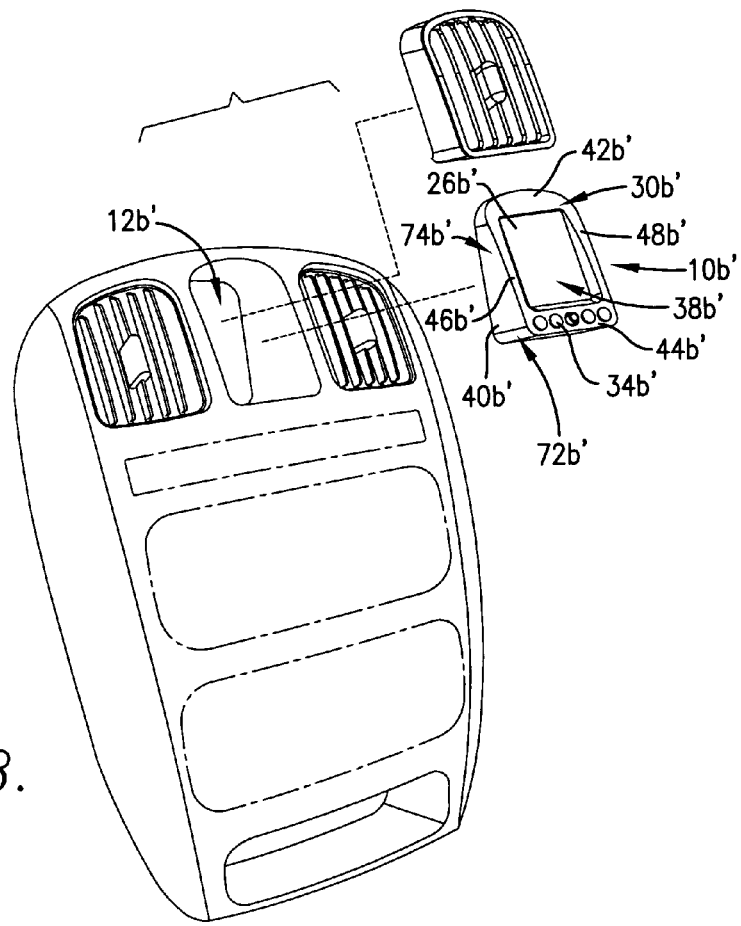
FIG. 8 is an exploded isometric view of the second preferred embodiment of the present invention, particularly illustrating removal of the air vent unit and insertion of the navigational device, wherein the navigational device is sized and configured to fit snugly within the open port.
Figure 9:
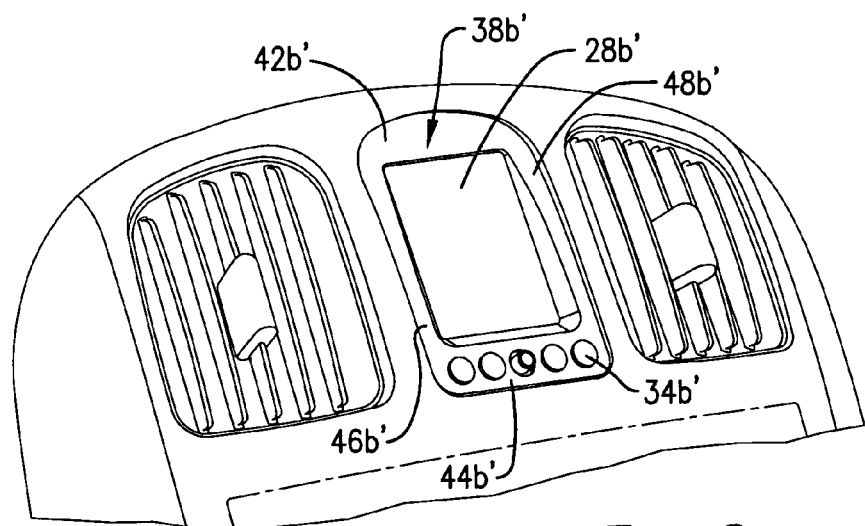
FIG. 9 is a fragmentary isometric view of the navigational device as illustrated in FIG. 8 inserted within the open port.

An alternative housing shape 30b' is illustrated in FIG. 8. As noted above, various open port 12b shapes and sizes necessitate various housing 30b shapes and sizes. As such, the housing 30b' illustrated in FIG. 8 preferably includes a front section 38b' and a rear section 40b'. The front section 38b' includes upper and lower walls 42b',44b' and left and right side walls 46b',48b', which together define an enclosed area for receiving a display 26b'. The upper wall 42b' is preferably arcuate so as to conform to the shape of an open port 12b'. Control buttons 34b' are preferably positioned on the lower wall 44b'. The rear section 40b' is preferably angled or sloped relative to the front section 38b' to better conform to the contours of the open port 12b' and to better position a navigational device 10b' at an optimal viewing angle. Additionally, the housing 30b' is preferably deeper at a lower end 72b' of the housing 30b' relative to an upper end 74b' of the housing 30b'. When positioned in the open port 12b', the front section 38b' of the housing 30b' is preferably flush with a face of the open port 12b', as illustrated in FIG. 9.

To install the navigational device 10b in the open port 12b, the second preferred embodiment provides for the navigational device 10b to fit within a first mounting unit 76b sized and configured to fit substantially within the open port 12b, as illustrated in FIGS. 6 and 7. The first mounting unit 76b is preferably adapted to permanently receive the navigational device 10b. The navigational device 10b is sized and configured to fit within the first mounting unit 76b and may be secured within the first mounting unit 76b using any conventional securing means, such as screws, brackets, adhesive, or other suitable methods. Alternatively, the navigational device 10b may be sized and configured to mount within the open port 12b resulting from removal of the air vent unit 70b without need for the first mounting unit 76b, as discussed in more detail below, and as illustrated in FIGS. 8 and 9.

The first mounting unit 76b is preferably box-shaped and includes left and right side walls 78b,80b and a rear wall 82b. The rear wall 82b is preferably provided with at least one opening 84b, as illustrated in FIG. 7. As with the first preferred embodiment, the navigational device 10b may include at least one wire or other adapter (not shown) mounted on the rear section 40b of the navigational device 10b for connecting the navigational device 10b to the power source (not shown) supplied by the vehicle. The wire on the navigational device 10b may then be inserted through the opening 84b in the rear wall 82b of the first mounting unit 76b.

The housing 30b of the navigational device 10b also preferably includes a first securing mechanism (not shown) for permanently securing the navigational device 10b within the first mounting unit 76b. The first securing mechanism may be any conventional securing means, such as screws, latches, brackets, or a combination of securing features.

The housing 30b also preferably includes insulation (not shown) for protecting the navigational device 10b and items housed within the navigational device 10b from excessive temperatures due to the vehicle's heating and cooling system. The insulation may be a housing of increased thickness (not shown) to act as a barrier against the excessive temperatures, actual insulation provided within the housing 30b, or other suitable protecting means.

Further, to avoid potential air noise problems that may result from removal of the air vent unit 70b, an air grate or vent (not shown) may be placed around the front section 38b of the housing 30b of the navigational device 10b. The grate serves to position the air flow so as to minimize noise resulting from removal of the air vent unit 70b. The air grate or vent may also cover any portion of the open port 12*b* the navigational device 10*b* does not fill to enhance the aesthetics of the installed navigational device 10*b*.

Figure 10:
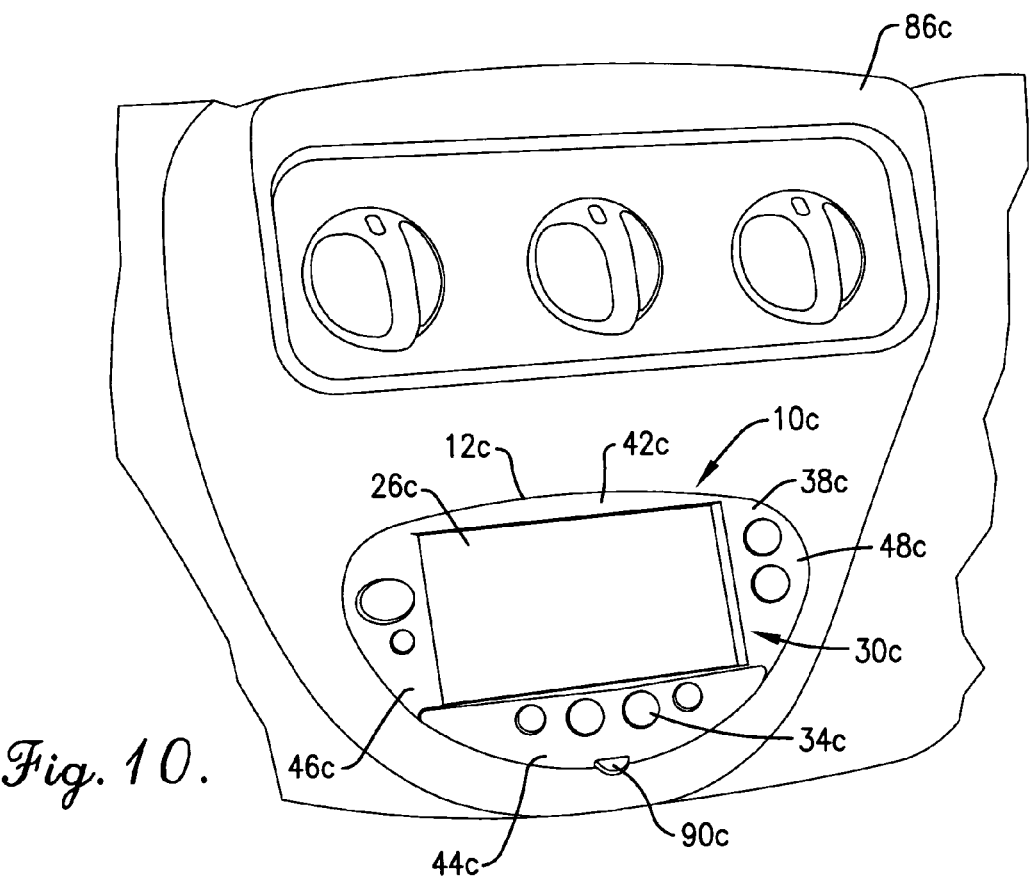
FIG. 10 is a fragmentary isometric view of the third preferred embodiment of the present invention particularly illustrating a navigational device mounted in a middle console of the vehicle.

In a third preferred embodiment, a navigational device 10*c* is sized and configured to fit within an open port 12*c* resulting from removal of a non-navigational component (not shown) in a middle console 86*c* of a vehicle, as illustrated in FIG. 10. The middle console 86*c* is preferably positioned directly under a dashboard (not shown) of the vehicle and generally center of the vehicle. In an alternative to the third preferred embodiment, the open port 12*c* may be positioned in the middle console 86*c* of the vehicle and result from removal of the air vent unit 70*b*, as illustrated in FIGS. 8 and 9. Similar to previous embodiments, a housing 30*c* of the navigational device 10*c* is preferably approximately six inches wide, four inches high, and five inches deep, although the width may range between two inches and twelve inches, the height may range between two inches and twelve inches, and the depth may range between two inches and twelve inches. The housing 30*c* preferably includes a front section 38*c* and a rear section (not shown). The front section 38*c* is preferably curvilinear to conform to the contours of the open port 12*c*. The front section 38*c* includes upper and lower walls 42*c*,44*c* and left and right side walls 46*c*,48*c*, which together define an enclosed area for receiving a display 26*c*. Control buttons 34*c* are preferably positioned on the lower wall 44*c* and the left and right side walls 46*c*,48*c*. A grasping portion or tab 90*c* is preferably positioned on the lower wall 44*c* of the front section 38*c*, to remove the navigational device 10*c* from the open port 12*c*.

Once inserted in the open port 12*c*, the front section 38*c* of the housing 30*c* is preferably flush with a face of the open port 12*c*, as illustrated in FIG. 10. The rear section (not shown) is attached to a rear face (not shown) of the front section 38*c* and houses a navigation component (not shown), processor (not shown), and memory (not shown), although a processor (not shown) and a memory (not shown) of the vehicle may alternatively be connected to the navigational device 10*c*.

In a fourth preferred embodiment, a navigational device 10*d* is sized and configured to fit within an open port 12*d* resulting from removal of a non-navigational component (not shown) in a dashboard 88*d* of a vehicle, as illustrated in FIGS. 11 and 12. The dashboard 88*d* preferably extends a width of the vehicle, and the navigational device 10*d* may be installed at any location within the dashboard 88*d*, including to a left of a steering wheel (not shown) of the vehicle. In an alternative to the fourth preferred embodiment, the open port 12*d* may be positioned in the dashboard 88*d* of the vehicle and result from removal of an air vent unit (not shown).

Similar to previous embodiments, a housing 30*d* of the navigational device 10*d* is preferably approximately six inches wide, four inches high, and five inches deep, although the width may range between two inches and twelve inches, the height may range between two inches and twelve inches, and the depth may range between two inches and twelve inches. The housing 30*d* preferably includes a front section 38*d* and a rear section 40*d*. The front section 38*d* is generally rectangularly-shaped and includes upper and lower walls 42*d*,44*d* and left and right side walls 46*d*,48*d*, which together define an enclosed area for receiving a display 26*d*.

The rear section 40*d* is preferably attached to a rear face 58*d* of the front section 38*d*. Similar to the second preferred embodiment, the rear section 40*d* of the housing 30*d* is preferably minimized to facilitate mounting within the open port 12*d*. A navigation component (not shown), processor (not shown), and memory (not shown) are preferably stored in the rear section 40*d*. As illustrated in FIG. 11, the navigational device 10*d* is configured to removably mount within the open port 12*d*, as will be described below. Once mounted in the open port 12*d*, the front section 38*d* of the housing 30*d* preferably extends beyond a face of the open port 12*d*, as illustrated in FIG. 12. Additionally, an area of a vertical cross-section of the front section 38*d* may be larger than an area of the face of the open port 12*d* to prevent the navigational device 10*d* from sliding too far into the open port 12*d*, as also illustrated in FIG. 2.

In the first through fourth embodiments, a navigational device is sized and configured to mount within an open port resulting from removal of a non-navigational component. In a fifth preferred embodiment, a navigational device 10*e* is sized and configured to fit within an empty recess 14*e* formed during manufacture of a vehicle, as illustrated in FIG. 13 and as exemplarily illustrated in FIG. 16. The empty recess 14*e* may have been provided in the vehicle for holding objects such as eyeglasses, compact discs, a compact disc player, a garage door opener, or other miscellaneous articles. As illustrated in FIG. 13, the empty recess 14*e* may be located in a middle console 86*e* of the vehicle. Alternatively, the empty recess 14*e* may be located in an overhead console (not shown) or a dashboard (not shown) of the vehicle.

A housing 30*e* of the navigational device 10*e* is preferably approximately nine inches wide, four inches high, and six inches deep, although the width may range between two inches and sixteen inches, the height may range between two inches and twelve inches, and the depth may range between two inches and sixteen inches. The housing 30*e* preferably includes a front section 38*e* and a rear section 40*e*. As illustrated in FIG. 13, a display 26*e* is preferably located on a left side 94*e* of the front section 38*e*, and control buttons 34*e* are preferably located on a right side 96*e* of the front section 38*e*. The rear section 40*e* is preferably attached to a rear face 58*e* of the front section 38*e*. Depending on the location of the empty recess within the vehicle, the rear section 40*e* of the housing 30*e* need not be completely inserted in the empty recess 14*e*, as illustrated in FIG. 13. Instead, the navigational device 10*e* may be mounted within the empty recess 14*e* as necessitated by an optimal viewing angle.

In a sixth preferred embodiment, a navigational device 10*f* is sized and configured to fit within a hollowed receptacle 16*f* that is mounted in a vehicle. The hollowed receptacle 16*f* may, for example, be on a pillar 98*f* of a door frame of the vehicle, as illustrated in FIG. 14. The pillar 98*f* is preferably on a driver's side of the vehicle so that the navigational device 10*f* may be used by the driver of the vehicle. The pillar 98*f*, known in the art as an A-pillar, is the main supporting structure of the vehicle's door. The pillar 98*f* is preferably covered with rigid plastic or other suitable material that matches the color of an interior of the vehicle for aesthetic purposes.

A housing 30*f* of the navigational device 10*f* is preferably approximately four inches wide, four inches high, and eight inches deep, although the width may range between two inches and twelve inches, the height may range between two inches and twelve inches, and the depth may range between two inches and sixteen inches. The housing 30*f* is preferably oblong in shape and includes a front section 38*f* and a rear section (not shown). The front section 38*f* is preferably generally circularly-shaped. Similar to the previous embodiments, the rear section is secured to a rear face (not shown) of the front section 38*f*. A navigation component (not shown), processor (not shown), and memory (not shown) are preferably stored in the rear section.

To retrofit the pillar 98*f* with the navigational device 10*f*, the hollowed receptacle 16*f* is secured to the pillar 98*f* by conventional securing means, such as screws. The receptacle 16f is preferably generally oblong in shape to match the shape of the rear section (not shown) of the housing 30f. Other receptacle shapes may be used, such as spherical or cuboidal. The receptacle 16f has a face that is generally circular in shape, although the face may be differently shaped depending on the shape of the receptacle 16f and the housing 30f. The receptacle 16f is preferably positioned on the pillar 98f for easy viewing by a driver of the vehicle. The navigational device 10f is sized and configured to fit and mount within the hollowed receptacle 16f. Similar to previous embodiments, the navigational device 10f may be configured to connect to an information source (not shown) of the vehicle or a power source (not shown) supplied by the vehicle. Additionally, the navigational device 10f may be permanently or removably installed in the receptacle 16f, as discussed in more detail below.

Alternatively, as with the first embodiment, the pillar 98f may be removed and a replacement pillar (not shown) having the receptacle 16f and navigational device 10f secured thereto may be installed on the vehicle's door frame. The replacement pillar preferably has substantially the same shape, size, and color as the original pillar 98f, other than the inclusion of the receptacle 16f and navigational device 10f. In this alternative, the receptacle 16f is preferably integrally formed with the replacement pillar.

Figure 17:
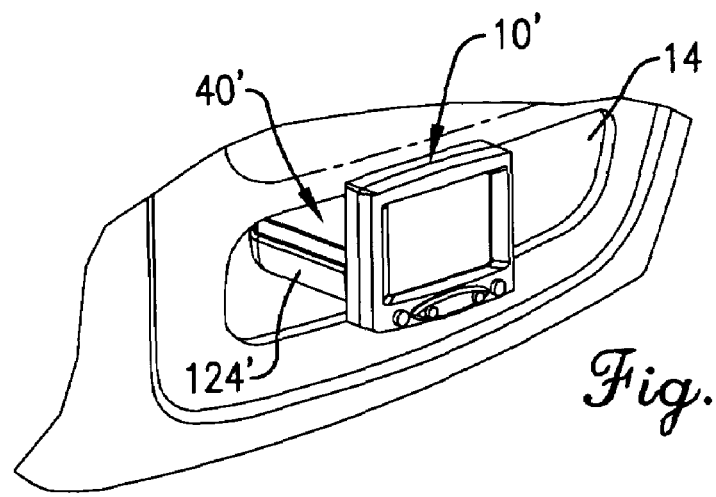
FIG. 17 is a fragmentary isometric view of the navigational device as illustrated in FIG. 16 removably mounted within the open port.

In all of the embodiments discussed above, the navigational device 10 may also be adapted to be removably mounted in the vehicle. As such, the navigational device 10 is configured to be removably mounted to a dashboard 88 of the vehicle, as illustrated in FIGS. 15 and 18, or within the open port 12, empty recess 14, or hollowed receptacle 16, as illustrated in FIGS. 16 and 17. Further, the navigational device 10 may be transferred between the dashboard 88 and the open port 12, empty recess 14, or hollowed receptacle 16. Further yet, the navigational device 10 may be removably mounted to a second vehicle, so that only one navigational device 10 need be used for multiple vehicles.

As illustrated in FIG. 15, the navigational device 10 is removably mounted to the dashboard 88 of the vehicle using a second mounting unit 100. The second mounting unit 100 includes a base 102 and a second securing mechanism 104. The base 102 is removably secured to the dashboard 88 of the vehicle using a vacuum lock 106. The base 102 is preferably generally circularly-shaped, and a circumference of the base 102 is partially surrounded by an overhanging flange 108. The base 102 is provided with a plurality of serrated teeth 110, the purpose of which will be described below.

The second securing mechanism 104 is secured to a rear section 40 of the housing 30 of the navigational device 10, as illustrated in FIG. 15, although the second securing mechanism 104 may be secured elsewhere on the housing 30. The second securing mechanism 104 is preferably circularly-shaped and includes first and second platforms 112, 114. The navigational device 10 is preferably attached to the first platform 112, and the first platform 112 is preferably secured to the second platform 114. The first platform 112 is of a slightly smaller circumference than the second platform 114, such that the second platform 114 overhangs the first platform 112. This overhang leaves a rim 116 which can be guided into the overhanging flange 108 of the base 102 for securing the second securing mechanism 104 to the base 102, and thus, the navigational device 10 to the dashboard 88.

The second platform 114 is preferably provided with a plurality of serrated teeth 118 positioned around the second platform's 114 360° circumference. The serrated teeth 118 on the second platform 114 preferably have a pitch equivalent to a pitch of the serrated teeth 110 on the base 102. Once the rim 116 on the second platform 114 is guided into the overhanging flange 108, the serrated teeth 118 on the second platform 114 may be locked with the serrated teeth 110 on the base 102. The combined second securing mechanism 104 and navigational device 10 are then operable to rotate within the base 102 for moving the navigational device 10 to a plurality of desired viewing positions.

The navigational device 10 is preferably sized and configured to also mount or slide within the open port 12, empty recess 14, or hollowed receptacle 16 of the vehicle, as noted above with respect to the fourth preferred embodiment and the open port 12d. The navigational device 10 may also be mounted within the second vehicle in a substantially similar method as described above with respect to the original vehicle. For example, the navigational device 10 may be mounted on a dashboard of the second vehicle or in an open port, empty recess, or hollowed receptacle, wherein the dashboard and open port, empty recess, or hollowed receptacle of the second vehicle are substantially similar to the dashboard 88 and open port 12, empty recess 14, and hollowed receptacle 16 of the original vehicle.

An alternative third mounting unit 120' is illustrated in FIG. 18. The third mounting unit 120' is similar to the second mounting unit 100 in that includes a substantially similar base 102' and second securing mechanism 104'. Using the third mounting unit 120', a navigational device 10', substantially similar to the navigational device 10d of the fourth preferred embodiment, may be mounted to a dashboard 88' of the vehicle. Alternatively, the navigational device 10' may be removably mounted within the open port 12, empty recess 14, or hollowed receptacle 16 or transferred to and mounted within the second vehicle. In addition to the base 102' and second securing mechanism 104', the third mounting unit 120' also includes a pedestal 122' and a cradle 124', as illustrated in FIG. 18. When mounting the navigational device 10' on the dashboard 88' of the vehicle, the pedestal 122' is secured to a first platform 112' of the second securing mechanism 104', and the cradle 124' is secured to the pedestal 122'. The pedestal 122' raises the viewing height of the navigational device 10'. The pedestal 122' includes a turning lock 126' that is operable to tilt the navigational device 10' to a preferred viewing angle.

The cradle 124' is preferably generally U-shaped in cross section and has a width to accommodate a width of the navigational device 10'. As illustrated in FIG. 16, the cradle 124' preferably has a base wall 128' which is surrounded by a rear wall 130' and two side walls 132', all three of which are upstanding relative to the base wall 128'. The side walls 132' are each preferably provided with a flange 134', the purpose of which is described below. To secure the navigational device 10' within the cradle 124', the flanges 134' of the cradle 124' are inserted into a pair of recessed channels 136' provided on a rear section 40' of a housing 30' of the navigational device 10'. The rear wall 130' of the cradle 124' prevents the navigational device 10' from excessive sliding.

The cradle 124' may be mounted within any type of open port 12, empty recess 14, or hollowed receptacle 16 including the open port 12a formed from removal of the non-navigational component 30a in the overhead console 36a, the open port 12b formed from removal of the air vent unit 70b, the open port 12c formed from removal of the non-navigational component (not shown) in the middle console 86c, the open port 12d formed from removal of the non-navigational component (not shown) in the dashboard 88d, the empty recess 14e formed during manufacture of the vehicle and originally empty, or the hollowed receptacle 16f secured on the pillar 98f of the door frame. The cradle 124' may be secured within the open port 12, empty recess 14, or hollowed receptacle 16 by any conventional securing means, such as screws, adhesive, etc.

In a yet further alternative, the navigational device 10 may be sized and configured to be removably installed within the open port 12, empty recess 14, or hollowed receptacle 16 by simply inserting the navigational device 10 into the open port 12, empty recess 14, or hollowed receptacle 16 without need for any mounting unit 76b,100,120'. As exemplarily illustrated in FIGS. 8 and 9, the housing 30b of the navigational device 10b is dimensioned to fit snugly within the open port 12b. The housing 30b is large enough that the navigational device 10b will not fall through or slide too far into the open port 12b, yet the housing 30b is small enough that a user need not force or push the navigational device 10b into the open port 12b. As exemplarily illustrated in FIG. 10 and as noted above, the user may remove the navigational device 10c from the open port 12c by pulling the grasping portion or tab 90c on the front section 38c of the housing 30c.

Since the navigational device 10 may be removably mounted within the vehicle, it may not be convenient to connect the navigational device 10 to the power source (not shown) supplied by the vehicle and positioned within the overhead console 36a, middle console 86c, or dashboard 88d of the vehicle each time the navigational device 10 is mounted or installed in the vehicle. Therefore, the navigational device 10 may be provided with an internal power source (not shown), such as at least one battery, to provide power to the navigational device 10. Alternatively, the navigational device 10 may be connected to the power source supplied by the vehicle, wherein the power source is externally accessible on the middle console 86c or dashboard 88d of the vehicle.

Seventh and eighth preferred embodiments are disclosed in U.S. patent application Ser. No. 10/411,821, filed Apr. 11, 2003, which is incorporated herein by reference.

In a ninth preferred embodiment of the present invention illustrated in FIGS. 19-26, a navigation assembly 177i is provided for use in a vehicle, such as a Jeep Wrangler. The navigation assembly 177i includes a carrying case 178i sized and configured to fit within a tray 14i or other recess of the vehicle, a cradle 179i pivotably mounted within the case 178i, a navigational device 10i that fits within the cradle 179i, and a speaker 57i mounted within the case 178i and connected to the navigational device 10i, as best illustrated in FIG. 19.

The tray 14i is preferably formed during manufacture of the vehicle and is positioned in the dashboard 88i of the vehicle, as illustrated in FIG. 20. The tray 14i may be provided in the vehicle for holding objects such as coins, eyeglasses, or other miscellaneous articles. As illustrated in FIG. 21, the tray 14i may be retrofitted with a first set of electrical connections 180i to connect the navigational device 10i to a power source and data source, such as a speedometer, supplied by the vehicle. Further, the tray 14i may include connections for an external speaker, display, computer, etc. The tray 14i is normally installed during manufacture of the vehicle and is heat staked to the dashboard 88i of the vehicle. The tray 14i may easily be removed from the dashboard 88i after manufacture of the vehicle, and the first set of electrical connections 180i may then be installed in the tray 14i without affecting the aesthetics of the tray 14i. Alternatively, the tray 14i may be removed and replaced with another tray already provided with the electrical connections 180i.

The carrying case 178i is preferably approximately twelve inches long, six inches wide, and two inches high, although the length may range between six inches and eighteen inches, the width may range between two inches and ten inches, and the height may range between one-half inch and four inches. The case 178i is preferably sized to fit within the tray 14i such that no securing mechanism is needed to secure the case 178i within the tray 14i. Alternatively, the tray 14i and case 178i may be provided with mating VELCRO, magnets, or other securing mechanism that provides for easy and quick installation and removal of the case 178i from the tray 14i. The case 178i is preferably made of hard plastic to protect the navigational device 10i housed within the case 178i, and the case 178i may include a gasket to seal the case 178i from any liquids, such as rainwater.

As illustrated in FIG. 21, the case 178i generally includes a base 182i and a hinged lid 184i, such that the lid 184i encloses the base 182i when the case 178i is closed. Similarly, when the case 178i is open, the base and lid 182i,184i are positioned generally side-by-side along the length of the case 178i, as illustrated in FIG. 20. Additionally, the case 178i preferably includes a second set of electrical connections 186i for connecting the case 178i to the first set of electrical connections 180i in the tray 14i, the purpose of which will be described below. The case 178i is also sized and configured to contain the speaker 57i operable to work in conjunction with the navigational device 10i and to provide audible navigation instructions.

As illustrated in FIG. 21, the hinged cradle 179i is positioned within the case 178i. The cradle includes a base or floor 188i, upstanding left and right side walls 190i, an upstanding rear wall 192i, and a double-axes pivot hinge 194i. Together, the floor 188i, left and right side walls 190i, and rear wall 192i form an enclosure sized and configured to receive the navigational device 10i. A detent 196i is provided on each side wall 190i, the purpose of which will be described below. A third set of electrical connections 198i is provided on the rear wall 192i and is preferably connected to the second set of electrical connections 186i in the case 178i, the purpose of which will also be described below.

The double-axes pivot hinge 194i includes first and second axes 200i,202i. The floor 188i and rear wall 192i of the cradle 179i are secured to the second axis 202i. The floor 188i rests upon, but is not secured to, the first axis 200i. The first axis 200i is secured to the carrying case 178i via a pair of brackets 204i. When the navigational device 10i is mounted within the cradle 179i, the navigational device 10i is operable to pivot from a non-viewing position that is generally flat and nested within the case 178i, as illustrated in FIG. 19, upwards to a viewing position that is generally perpendicular to the flat position, as illustrated in FIGS. 21 and 23. When the cradle 179i is in the upwards position, the cradle 179i may pivot around the first axis 200i to various forward positions, as illustrated in FIGS. 23, 24, and 25. Because the floor 188i of the cradle 179i is not secured to the first axis 200i of rotation, the cradle 179i may pivot approximately 180° around the first axis 200i, which moves the cradle 179i into a foremost position, as illustrated in FIGS. 24 and 25. The cradle 179i may then be pivoted about the second axis 202i to various viewing angles. FIG. 25 illustrates an alternative viewing angle where the cradle 179i is positioned in the foremost viewing angle allowing the lid 184i of the case 178i to fold flat against the base 182i.

The navigational device 10i is of a conventional size and shape and includes a navigation component, a processor, a memory, and a housing 30i, as illustrated in FIG. 21. However, unlike the prior embodiments, the navigational device 10i is not custom-designed to particularly fit an existing space in the vehicle. An example of a suitable navigational device 10i is the GARMIN Pilot 650, manufactured by Garmin International, Inc.

The navigational device 10i is preferably self-contained within the case 178i, such that the case 178i includes the navigational device 10i, a display 26i of the navigational device 10i, and the speaker 57i, as described above. Alternatively, the navigational device 10i may be integrated with a display and/or speaker previously installed in the vehicle either during or after manufacture of the vehicle. Therefore, the navigational device 10i may include only an antenna 32i, a navigation component, a navigation processor, and control buttons 34i.

The navigational device 10i also preferably includes a fourth set of electrical connections 206i operable to mate with the third set of electrical connections 198i on the cradle 179i and/or the second set of electrical connections 186i on the carrying case 178i, as illustrated in FIG. 22. Once the fourth set of electrical connections 206i on the navigational device 10i are connected to the first set of electrical connections 186i on the tray 14i, via the second and third sets of electrical connections 186i,198i on the case 178i and cradle 179i, the navigational device 10i is operable to receive power and data from the power source and data source supplied by the vehicle and transfer data to the vehicle. Alternatively, the navigational device 10i may include an internal power and/or data source.

The housing 30i preferably includes a pair of grooves 208i, which are sized and positioned to mate with the detents 188i on the cradle 179i and are operable to secure the navigational device 10i within the cradle 179i. This securing mechanism allows a user of the navigational device 10i to easily and quickly slide the navigational device 10i within the cradle 179i. Alternative securing mechanisms may be used, such as a quick-release latch or VELCRO.

As best illustrated in FIG. 22, the antenna is preferably hinged to a rear section 40i of the housing 30i. When a user of the navigational device 10i desires to position the device 10i within the cradle 179i, the user must pivot the antenna 32i upwardly so that it may clear a top of the cradle 179i. When the navigational device 10i is not positioned within the cradle 179i, the antenna 32i may be pivoted generally flush with the rear section 40i of the housing 30i.

As illustrated in FIG. 26, the navigational device 10i and speaker 57i may alternatively be positioned in the lid 184i of the case 178i, as opposed to the base 182i. When in the lid 184i, the navigational device 10i may be stored directly in the case 178i without need for the cradle 179i, although the cradle 179i may be provided if multiple viewing positions are desired. In this alternative, the use of the tray 14i for storage of coins or other miscellaneous articles is advantageously not interrupted.

When the navigational device 10i and speaker 57i are contained within the lid 184i, the case 178i will be top-heavy. Therefore, the base 182i must either be weighted such that the weight of the lid 184i will not force the base 182i from the tray 14i. Alternatively, and preferably, the base 182i includes a securing mechanism, such as VELCRO or magnets, to secure the case 178i within the tray 14i.

A navigation assembly 177j constructed in accordance with a tenth preferred embodiment of the present invention is substantially similar to the navigation assembly 177i of the ninth preferred embodiment, except that a conventional navigational device 10j and speaker 57j are mounted directly in a tray 14j or other recess without need for a carrying case. The tray 14j may then be provided with a hinged cradle 179j and a hinged cover or lid 184j. The navigational device 10j may be positioned within the cradle 179j, and similar to the ninth preferred embodiment, the cradle 179j may be operable to pivot from a flat, nested position within the tray 14j upwards to a viewing position approximately perpendicular to the tray 14j. When the cradle 179j and navigational device 10j are stored flat within the tray 14j and not in use, the lid 184j may enclose the tray 14j, protecting the navigational device 10j from the elements and from view. When the navigational device 10j is in use, the cradle 179j and navigational device 10j pivot upwards, and the lid 184j rests against a top of the navigational device 10j.

Although the invention has been described with reference to the preferred embodiment illustrated in the attached drawing figures, it is noted that equivalents may be employed and substitutions made herein without departing from the scope of the invention as recited in the claims. For example, the preferred embodiments may be combined to produce the navigational device 10 having various features. For example, the navigational device 10b may be removably mounted in the air vent unit 70b, or the navigational device 10b mounted in the air vent unit 70b may be operable to connect to the power source supplied by the vehicle. Additionally, a navigational device (not shown) sized and configured to fit within an open port (not shown) located elsewhere in the vehicle, such as in a rear seating area of a van, may be provided.

Further, as discussed above, the navigational device 10 is configured to be transferred between vehicles. As such, the navigational device 10 may be removably mounted in the vehicle using any mounting unit 76b,100,120', or the navigational device 10 may be sized and configured to fit within the open port 12, tray 14, or hollowed receptacle 16 of each vehicle, either using the mounting unit 120' or sizing the housing 30 of the navigational device 10 to fit snugly within the open port 12, empty recess 14, or hollowed receptacle 16.

Further yet, the navigational device 10 may also be permanently mounted in the open port 12, empty recess 14, or hollowed receptacle 16 using any conventional securing means (not shown), such as latches or screws.

Having thus described the preferred embodiment of the invention, what is claimed as new and desired to be protected by Letters Patent includes the following:

1. A navigation assembly for use in a vehicle comprising:
a navigational device; and
a carrying case configured to substantially enclose all sides of the navigational device, wherein the case includes:
one or more electrical connections configured to electrically couple with the navigation device,
a second one or more electrical connections disposed on an exterior of the carrying case for connecting to a dashboard,
a third one or more electrical connections disposed on an interior of the carrying case between the navigation device and the second one or more electrical connections,
a speaker coupled with at least one of the electrical connections and operable to generate sound corresponding to signals provided by the navigation device through one or more of the electrical connections, and
a base and a hinged lid, such that the lid encloses the base and the speaker when the case is closed.

2. The navigation assembly as claimed in claim 1, wherein the second one or more of the electrical connections are configured for connecting the navigational device to a power source supplied by the vehicle.

3. The navigation assembly as claimed in claim 1, wherein the case may easily and quickly be removed from the tray.

4. The navigation assembly as claimed in claim 1, wherein the navigational device and speaker are both positioned within the base of the case.

5. The navigation assembly as claimed in claim 4, further including a hinged cradle operable to mount within the case and sized and configured to receive the navigational device.

6. The navigation assembly as claimed in claim 5, wherein the cradle includes first and second axes of rotation, such that the navigational device, when mounted in the cradle, may be positioned in a variety of viewing angles.

7. The navigation assembly as claimed in claim 6, wherein the cradle is operable to pivot from a folded, nested position that is substantially flat within the case to an upwards, viewing position approximately perpendicular to the base of the case.

8. The navigation assembly as claimed in claim 7, wherein the navigational device may easily and quickly be mounted in and removed from the cradle.

9. The navigational assembly as claimed in claim 1, wherein the navigational device and speaker are both positioned within the lid of the case, such that when the case is open, the navigational device is in a viewing position.

10. The navigational assembly as claimed in claim 1, wherein the navigational device is a global positioning satellite device including—
a navigation component,
a processor coupled with the navigation component,
a memory coupled with the processor,
a display,
an input, and
a housing for housing the navigation component, the processor, and the memory.

11. The navigation assembly as claimed in claim 1, wherein the carrying case includes a base and a hinged lid, such that when the navigational device is pivoted to a flat, nesting position within the case, the lid is operable to enclose the navigational device, and when the navigational device is pivoted upwards in a viewing position, the lid is operable to pivot upwards and rest generally against a top of the navigational device.

12. A navigation assembly for use in a vehicle comprising:
a navigational device; and
a carrying case sized and configured to conform to a tray recessed downwardly within a top surface of a dashboard running along a windshield of the vehicle, wherein the carrying case is configured to substantially and removably enclose all sides of the navigational device and is adapted to be removed from the tray with the navigational device substantially enclosed therein,
the carrying case further including:
one or more electrical connections configured to electrically couple with the navigation device, and
a speaker coupled with at least one of the electrical connections and operable to generate sound corresponding to signals provided by the navigation device through one or more of the electrical connections.

13. The navigation assembly as claimed in claim 12, wherein the tray is positioned on a dashboard of the vehicle.

14. The navigation assembly as claimed in claim 12, wherein one or more of the electrical connections are configured for connecting the navigational device to a power source supplied by the vehicle.

15. The navigation assembly as claimed in claim 12, wherein the carrying case includes a base and a hinged lid, such that the lid encloses the base when the case is closed.

16. The navigation assembly as claimed in claim 12, wherein the case may easily and quickly be removed from the tray.

17. The navigational assembly as claimed in claim 12, wherein the navigational device and speaker are both positioned within a lid of the case, such that when the case is open, the navigational device is in a viewing position.

18. The navigational assembly as claimed in claim 12, wherein the navigational device is a global positioning satellite device including—
a navigation component,
a processor coupled with the navigation component,
a memory coupled with the processor,
a display,
an input, and
a housing for housing the navigation component, the processor, and the memory.

19. The navigation assembly as claimed in claim 12, wherein the carrying case includes a base and a hinged lid, such that when the navigational device is pivoted to a flat, nesting position within the case, the lid is operable to enclose the navigational device, and when the navigational device is pivoted upwards in a viewing position, the lid is operable to pivot upwards and rest generally against a top of the navigational device.

20. A navigation assembly for use in a vehicle comprising:
a navigational device; and
a carrying case configured to substantially enclose all sides of the navigational device, the case being sized and configured to fit within a tray on a dashboard of the vehicle such that the case does not move within the tray and is held firmly in place by gravity and the close conformity of the case to the tray,
the carrying case further including:
one or more electrical connections configured to electrically couple with the navigation device,
a speaker coupled with at least one of the electrical connections and operable to generate sound corresponding to signals provided by the navigation device through one or more of the electrical connections, and
a base and a hinged lid, such that when the navigational device is pivoted to a flat, nesting position within the case, the lid is operable to enclose the navigational device, and when the navigational device is pivoted upwards in a viewing position, the lid is operable to pivot upwards and rest generally against a top of the navigational device.

21. The navigation assembly as claimed in claim 20, wherein the tray recessed downwardly within a top surface of a dashboard running along a windshield of the vehicle.

22. The navigational assembly as claimed in claim 20, wherein the navigational device and speaker are both positioned within a lid of the case, such that when the case is open, the navigational device is in a viewing position.

23. The navigation assembly as claimed in claim 20, wherein the carrying case includes a base and a hinged lid, such that the lid encloses the base when the case is closed.

24. The navigation assembly as claimed in claim 20, wherein the case may easily and quickly be removed from the tray.

* * * * *